United States Patent [19]
Aoki et al.

[11] Patent Number: 5,418,564
[45] Date of Patent: May 23, 1995

[54] DUAL-TYPE IMAGING DEVICE HAVING MULTIPLE LIGHT SENSITIVE ELEMENTS

[75] Inventors: Harumi Aoki; Nobuhiro Tani; Keiji Sawanobori, all of Tokyo, Japan

[73] Assignee: Asashi Kogaku Kogyo Kabushiki Kaisha, Tokyo, Japan

[21] Appl. No.: 115,142

[22] Filed: Sep. 2, 1993

[30] Foreign Application Priority Data

Sep. 4, 1992 [JP] Japan .................................. 4-262810
Sep. 16, 1992 [JP] Japan .................................. 4-272343
Sep. 16, 1992 [JP] Japan .................................. 4-272344

[51] Int. Cl.6 .............................................. H04N 9/09
[52] U.S. Cl. .................................... 348/264; 348/262; 348/279
[58] Field of Search ............................. 358/41, 43, 50; H04N 9/04, 9/07, 9/09; 348/264, 262, 279, 273

[56] References Cited

U.S. PATENT DOCUMENTS 5,168,350 12/1992 Shinozaki et al. ..................... 358/50
5,229,859 7/1993 Sasaki .................................. 358/43

FOREIGN PATENT DOCUMENTS 61-161886 7/1986 Japan ............................. H04N 9/07
61-280187 12/1986 Japan ............................. H04N 9/04
472989 3/1992 Japan ............................. H04N 9/07
WO9001845 2/1990 WIPO ............................ H04N 5/238

Primary Examiner—James J. Groody
Assistant Examiner—Cheryl Cohen
Attorney, Agent, or Firm—Sandler, Greenblum & Bernstein

[57] ABSTRACT

A dual type imaging device includes a first CCD and a second CCD, on which complementary color filters with a checkerboard (or matrix) arrangement is disposed. The complementary color filters have the same construction as each other, having magenta elements, yellow elements, cyan elements and green elements arranged in a regular manner. The arrangement of the color elements of the filter of the first CCD is offset, by a width of one light-sensitive element, to the arrangement of the color elements of the filter of the second CCD. An R-signal, a G-signal and a B-signal are sensed in accordance with four light-sensitive elements which are arranged in a 2×2 matrix.

9 Claims, 16 Drawing Sheets

Fig. 3

| Mg | G | Mg | G | Mg | ... |
|----|---|----|---|----|-----|
| Ye | Cy | Ye | Cy | Ye | ... |
| G | Mg | G | Mg | G | ... |
| Ye | Cy | Ye | Cy | Ye | ... |
| Mg | G | Mg | G | Mg | ... |
| ⋮ | ⋮ | ⋮ | ⋮ | ⋮ | |

51

| Mg | G | Mg | G | Mg | ... |
|----|---|----|---|----|-----|
| Ye | Cy | Ye | Cy | Ye | ... |
| G | Mg | G | Mg | G | ... |
| Ye | Cy | Ye | Cy | Ye | ... |
| Mg | G | Mg | G | Mg | ... |
| ⋮ | ⋮ | ⋮ | ⋮ | ⋮ | |

52

FIRST FIELD        SECOND FIELD (a)        (b)        (c)

DUAL-TYPE IMAGING DEVICE HAVING MULTIPLE LIGHT SENSITIVE ELEMENTS

BACKGROUND OF THE INVENTION

1. Field of the Invention

The present invention relates to a video device having a dual type imaging device.

2. Description of the Related Art

In human eyes, sensitivity for color is lower than that for luminance. Therefore, in a standard such as the NTSC (National Television System Committee) system, it is prescribed that the resolution for color is lower than that for luminance. Therefore, a G-and-R/B system is provided in a conventional dual-type imaging device. Such an imaging device has a first CCD (charge coupled device) which is provided with a filter F1, for passing green light, and a second CCD which is provided with a filter F2 which passes red and blue light to alternate light-sensitive elements. The filters F1 and F2 are shown in FIG. 1. Output signals of the first CCD and the second CCD are superposed on each other in an image signal processing circuit. Namely, a luminance signal is obtained from each light-sensitive element on the first CCD, and a color signal is obtained from each pair of light-sensitive elements on the second CCD in combination with the light-sensitive elements on the first CCD.

Thus, in the conventional device, since a color signal is obtained from information from pairs of light-sensitive elements (corresponding to two pixels) on the second CCD, the amount of information for a color signal is not sufficient, in comparison with the information for a luminance signal, and a high-quality color image cannot be obtained. When such an image signal, having a low quality, is inputted into a computer to carry out an image processing for each pixel, the deterioration of the image quality may be remarkable. To prevent the deterioration of the image quality from occurring, a triple type imaging device, in which three CCDs are provided, is used. A filter, for passing red, green or blue light, is placed on each of the CCDs. In this construction, however, the imaging device is bulky and the electronic circuits are complex.

On the other hand, conventionally, as a photometry device provided in a still-video camera, a device in which photometry (determination of the exposure value) is carried out by using a CCD provided for sensing an image is known. However, since the dynamic range of the CCD is narrow, the photometry data may not be within the dynamic range. In such a case, it is necessary that the photometry operation should be repeatedly carried out while changing the dynamic range until the photometry data is within the dynamic range, and thus, the exposure value cannot be determined quickly. Conversely, in a construction in which a sensor for measuring a daylight is provided on an outer surface of the camera body, since the photometry can be carried out with a broad dynamic range, the exposure value can be determined in a short time. However, this sensor is provided for measuring merely the daylight, and therefore, the measured area may not coincide with the object to be photographed. Accordingly, the exact photometry data may not be obtained by the sensor.

SUMMARY OF THE INVENTION

Therefore, an object of the present invention is to provide a dual type imaging device, by which the color resolution is improved without complex electronic circuits, and an image signal, in which the image quality is not lowered when image processing is carried out by a computer, is generated.

According to the present invention, there is provided a dual-type imaging device comprising a first imaging device, a second imaging device and a sensing mechanism.

The first imaging device and the second imaging device have respective spectral characteristics in which four light-sensitive elements, which are arranged in a 2×2 matrix, include at least two light-sensitive elements having different complementray colors. The sensing mechanism produces an R-signal, a G-signal and a B-signal in accordance with signals obtained by superposing the signals of the four light-sensitive elements on the first imaging device on the signals of the four light-sensitive elements on the second imaging device in a predetermined manner.

The other object of the present invention is to provide a photometry device, by which photometry, with a wide dynamic range, is carried out with high accuracy, and thus the exposure value can be determined in a short time, with a simple construction.

According to the present invention, there is provided a photometry device comprising a first and a second imaging device, first sensing means for sensing a luminance signal from the first imaging device, second sensing means for sensing a luminance signal from the second imaging device, independent from the first sensing means, and photometry measurement means for carrying out a photometry measurement based on the luminance signals sensed by the first and second sensing means.

Further, according to the present invention, there is provided a video device comprising a first imaging device, a second imaging device, a control mechanism and a photometry measurement mechanism.

The first imaging device and the second imaging device have respective spectral characteristics in which group of four light-sensitive elements, which are arranged in a 2×2 matrix, include at least two light-sensitive elements which are sensitive to different complementary colors from each other. The control mechanism controls the first and second imaging devices to sense luminance signals in accordance with output signals of the first and second imaging devices. The photometry measurement mechanism carries out photometry measurement in accordance with the luminance signals sensed by the control mechanism.

Further, according to the present invention, there is provided a video device comprising a first and a second imaging device, a first photometry measurement mechanism, a second photometry measurement mechanism, a determining mechanism, a third photometry mechanism, an obtaining mechanism, and a sensing mechanism.

The first photometry measurement mechanism senses a luminance signal from the first imaging device, based on a first exposure control signal. The second photometry measurement mechanism senses a luminance signal from the second imaging device, based on a second exposure control signal different from the first exposure control signal. The determining mechanism determines a corrected exposure control signal based on the luminance signals sensed by the first and second photometry measurement mechanism. The third photometry measurement mechanism senses luminance signals from the first and second imaging devices, based on the corrected exposure control signal. The obtaining mechanism obtains a fixed exposure control signal by combining the luminance signals obtained by the third photometry measurement mechanism. The sensing mechanism senses image signals from the first and second imaging devices in accordance with the fixed exposure control signal.

BRIEF DESCRIPTION OF THE DRAWINGS

The present invention will be better understood from the description of the preferred embodiments of the invention set forth below, together with the accompanying drawings, in which:

FIG. 3 is a diagram showing arrangements of first and second color filters disposed on light receiving surfaces of first and second CCDs;

DESCRIPTION OF THE PREFERRED EMBODIMENTS

Figure 1:
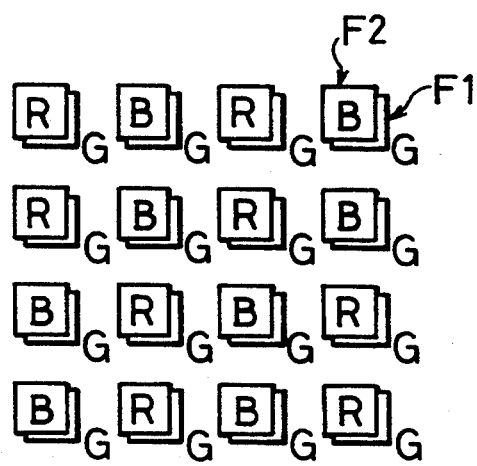
FIG. 1 is a diagram showing a color filter provided in a conventional dual type imaging device.

The present invention will now be described with reference to the embodiments shown in the drawings.

Figure 2:
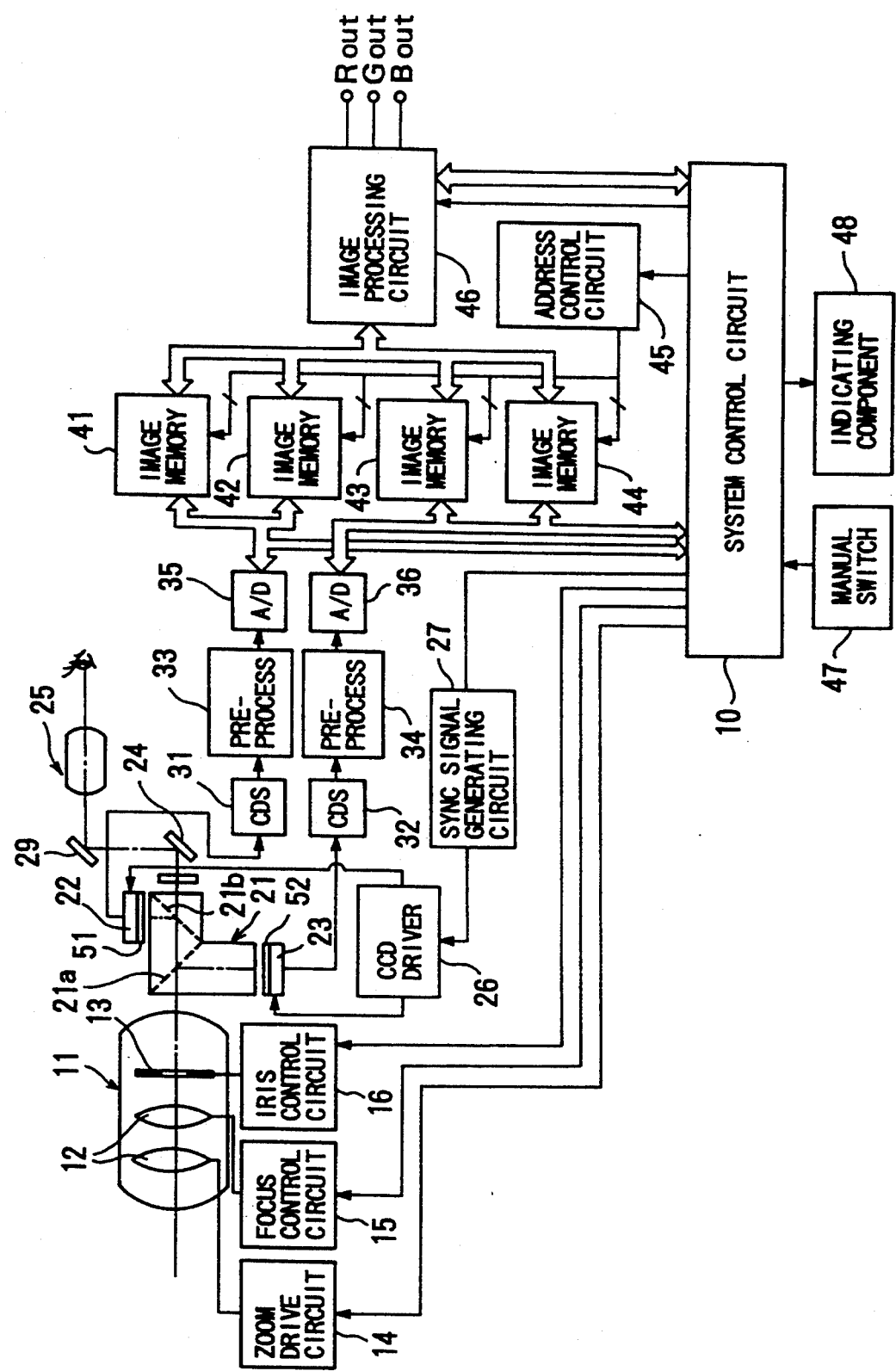
FIG. 2 is a block diagram showing a still-video camera to which a first embodiment of the present invention is applied.

FIG. 2 is a block diagram showing a still-video camera to which a first embodiment of the present invention is applied.

An imaging optical system 11 has a lens 12 and an aperture 13. The lens 12 is driven by a zoom drive circuit 14 to zoom the image, and driven by a focus control circuit 15 to focus the image. The aperture 13 is controlled by an iris control circuit 16, to control the exposure, so that the opening of the aperture 13 is adjusted. The zoom drive circuit 14, the focus control circuit 15 and the iris control circuit 16 are controlled by a system control circuit 10.

Light passing through the imaging optical system 11 focusses on a first CCD 22 and a second CCD 23 through a prism 21, so that the same images are formed on the CCDs 22 and 23. This light also passes to a finder optical system 25 through the prism 21 and mirrors 24 and 29. First and second filters 51 and 52 are provided on the first and second CCDs 22 and 23, respectively. These CCDs 22 and 23 are driven by a CCD driver 26, so that image signals corresponding to the images formed on the CCDs 22 and 23 are supplied to correlation-double-sampling (CDS) circuits 31 and 32. The CCD driver 26 is operated in accordance with a pulse signal outputted from a synchronizing signal generating circuit 27 controlled by the system control circuit 10.

The image signals inputted to the CDS circuits 31 and 32 are processed so that a reset noise is removed, and then subjected to predetermined processes, such as a gamma correction, in pre-process circuits 33 and 34. Then, the image signals are converted to digital signals by A-D converters 35 and 36, and stored in image memories 41 through 44. Addresses of the image memories 41 through 44 at which the image signals are stored are controlled by the system control circuit 10 through an address control circuit 45.

An image signal processing circuit 46 is provided for applying a predetermined process (to be described later) to the image signals stored in the image memories 41 through 44, so that a luminance signal, an R-signal, a G-signal and a B-signal are outputted. The R-signal, G-signal, B-signals are transmitted to a display device through an interface circuit or a computer.

A manual switch 47 and an indicating component 48 are connected to the system control circuit 10. The manual switch 47 is provided for operating the still-video camera, and the indicating component 48 is provided for indicating the state of the mannual switch 47.

Prism 21 has a first beam-splitter 21a and a second beam splitter 21b. The amount of light passed to the first and second CCDs 22, 23 and the finder optical system 25 are in the ratios 4:4:2, for example, by the operation of the beam splitters 21a and 21b, and thus, light having the same intensity is passed to each of the CCDs 22 and 23. Namely, part of the light entering the prism 21 from the optical system 11 is reflected by the first beam splitter 21a, and directed to the second CCD 23. The rest of the light passes through the first beam splitter 21a to the second beam splitter 21b. A part of the light is reflected by the second splitter 21b, and directed to the first CCD 22. The remaining light, i.e., the light passing through the first and second beam splitters 21a and 21b passes out of the prism 21. This light is reflected by the mirrors 24 and 29, and passes to the finder system 25. Note, the mirrors 24 and 29 are provided for deviating the optical axis of the finder system 25 from the optical axis of the imaging optical system 11, and can be omitted.

The amount of light passed to each of the first and second CCDs 22 and 23 is not necessarily the same. Namely, when the amounts of light passed to the CCDs 22 and 23 are different, gain adjustments for the output signals of the CCDs 22 and 23 are carried out so that the outputs of the CCDs 22 and 23 have the same values.

FIG. 3 shows arrangements of the first and second color filters 51 and 52 disposed on the light receiving surfaces of the first and second CCDs 22 and 23. Each of the color filters 51 and 52 is a complementary color filter with a checkerboard (or matrix) arrangement, and all have the same construction. In the color filters 51 and 52, filter elements for passing magenta (Mg) light, yellow (Ye) light, cyan (Cy) light and green (G) light are arranged alternately or in a regular manner. Namely, in four light-sensitive elements which are arranged in a 2×2 matrix, a green (G) element, a magenta (Mg) element, a yellow (Ye) element and a cyan (Cy) element, which have different spectral characteristics from each other, are provided.

Comparing the positional relationship of the second color filter 52 to the CCD 23 with the positional relationship of the first color filter 51 to the CCD 22, the second color filter 52 is offset by the width of one light-sensitive element (hereinafter referred to as LSE) in a horizontal direction (leftward in FIG. 3), relative to the CCD 23. Regarding the left corner LSE P of the frame, for example, the element is magenta in the first color filter 51 while the element is green in the second color filter 52.

Thus, the spectral characteristics of the CCDs 22 and 23 are regularly changed, in a complementary-color-difference line-sequence. The spectral characteristics of the CCD 23 with the color filter 52 are offset, in a horizontal direction, by the width of one LSE with respect to the spectral characteristics of the CCD 22 with the color filter 51.

The output signal of the first CCD 22 and the output signal of the second CCD 23 are tempolarily stored in the image memories 41 through 44 as digital signals, and then read out from the memories 41 through 44 and processed by the image signal processing circuit 46. As described below, the signals from the corresponding LSEs are superposed on each other, and thus an R-signal, a G-signal and a B-signal are sensed and an image signal obtained.

Figure 4:
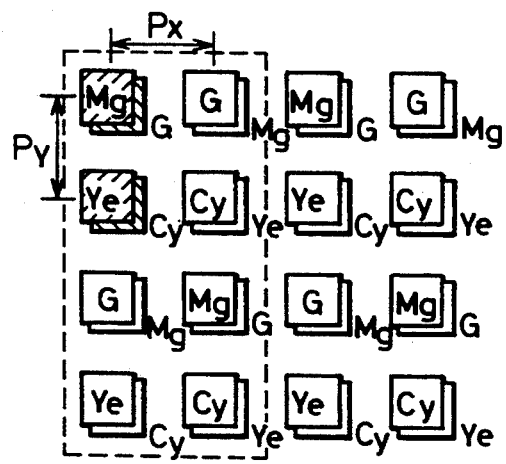
FIG. 4 is a diagram showing a state in which, for output signals of the first and second CCDs, signals from light-sensitive elements corresponding to each other are superposed on each other.

FIG. 4 shows this superposition. As can be understood from this drawing, a magenta (Mg) element of the filter 51 of the first CCD 22 and a green (G) element of the filter 52 of the second CCD 23 correspond to the same pixel. Similarly, a green (G) element of the filter 51 and a magenta (Mg) element of the filter 52 correspond to the same pixel, a yellow (Ye) element of the filter 51 and a cyan (Cy) element of the filter 52 correspond to the same pixel, and a cyan (Cy) element of the filter 51 and a yellow (Ye) element of the filter 52 correspond to the same pixel. Note, in FIG. 4, reference "Px" indicates a space (one pitch) between pixels arranged in a horizontal direction, and reference "Py" indicates a space (one pitch) between pixels arranged in a vertical direction, respectively.

The method of sensing the R-signal is described below.

It is supposed that the R-signal and the B-signal included in magenta (Mg) are $R_{Mg}$ and $B_{Mg}$, the R-signal and the G-signal included in yellow (Ye) are $R_{Ye}$ and $G_{Ye}$, and the G-signal and the B-signal included in cyan (Cy) are $G_{Cy}$ and $B_{Cy}$. Mg, Ye and Cy are expressed as follows. Namely, $$Mg = R_{Mg} + B_{Mg}, \quad Ye = R_{Ye} + G_{Ye}, \quad Cy = G_{Cy} + B_{Cy}$$

The R-signal is obtained from four LSEs (hatched in FIG. 4) composed of a magenta (Mg) element and a yellow (Ye) element aligned in a vertical direction, and a green (G) element and a cyan (Cy) element superposed on the magenta element and the yellow element, respectively, according to the following equation.

$$\begin{aligned} Rs &= (Mg + Ye) - \alpha(G + Cy) \\ &= R_{Mg} + B_{Mg} + R_{Ye} + G_{Ye} - \alpha G - \alpha G_{Cy} - \alpha B_{Cy} \\ &= R_{Mg} + R_{Ye} + G_{Ye} - \alpha(G + G_{Cy}) + B_{Mg} - \alpha B_{Cy} \\ &= R_{Mg} + R_{Ye} \end{aligned} \quad (1)$$

To satisfy equation (1), $$\alpha = G_{Ye}/(G + G_{Cy}) = B_{Mg}/B_{Cy}.$$

The B-signal is obtained by the following equation, similar to the above. Namely, $$\begin{aligned} Bs &= (Mg + Cy) - \beta(G + Ye) \\ &= R_{Mg} + B_{Mg} + G_{Cy} + B_{Cy} - \beta G - \beta RYe - \beta G_{Ye} \\ &= B_{Mg} + B_{Cy} + G_{Cy} - \beta(G + G_{Ye}) + R_{Mg} - \beta R_{Ye} \\ &= B_{Mg} + B_{Cy} \end{aligned} \quad (2)$$

To satisfy equation (2), $$\beta = G_{Cy}/(G + G_{Ye}) = R_{Mg}/R_{Ye}.$$

The G-signal is obtained from the luminance signal (Y), Rs and Bs obtained by the equations (1) and (2). Namely, $$\begin{aligned} Gs &= Y - Rs - Bs \\ &= (Mg + Cy + G + Ye) - Rs - Bs \\ &= G + G_{Ye} + G_{Cy} \end{aligned} \quad (3)$$

The spectra of the R-signal, the G-signal, the B-signal and the luminance signal obtained as described above are described below.

First, the spectrum of the luminance signal Y is described.

Figure 5:
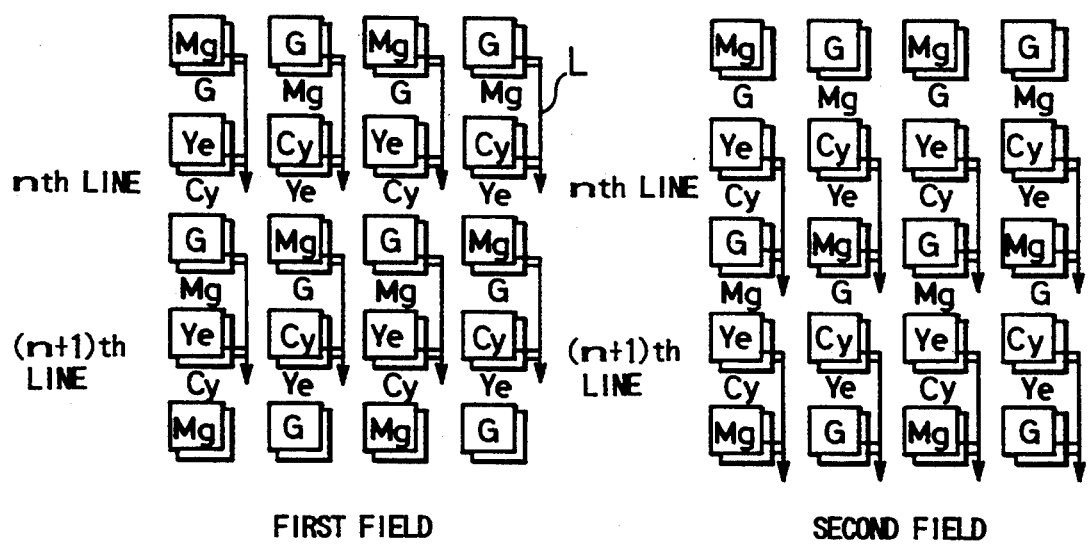
FIG. 5 is a diagram showing a way by which color signals in the first and second fields are sensed.

A fundamental sampling series is set to $$S_0(x,y) = \Sigma_m \Sigma_n \delta(x - 2mP_x, y - 4nP_y)$$

where "$\delta$" is the delta function, "x" is a coordinate in a horizontal direction, "y" is a coordinate in a vertical direction, and "m" and "n" are integers. Optical image distributions of Mg, G, Ye and Cy to an LSE are expressed as $I_{A1Mg}(x,y)$, $I_{A1G}(x,y)$, $I_{A1Ye}(x,y)$, $I_{A1Cy}(x,y)$ for the first CCD 22, and expressed as $I_{A2Mg}(x,y)$, $I_{A2G}(x,y)$, $I_{A2Ye}(x,y)$, $I_{A2Cy}(x,y)$ for the second CCD 23. Then, the spectrum for a combination of LSEs connected to each other through lines L in FIG. 5 are obtained as follows:

Supposing that the outputs of each LSE in the first and second CCDs 22 and 23 are equal to each other, the following equations are true.

$$I_{AMg}(x,y) = I_{A1Mg}(x,y) = I_{A2Mg}(x,y)$$

$$I_{AG}(x,y) = I_{A1G}(x,y) = I_{A2G}(x,y)$$

$$I_{AYe}(x,y) = I_{A1Ye}(x,y) = I_{A2Ye}(x,y)$$

$$I_{ACy}(x,y) = I_{A1Cy}(x,y) = I_{A2Cy}(x,y)$$

If luminance signal components of the first and second fields are as follows, $$I_{Y1}(u,v) = I_{AMg}(u,v)\exp(-jP_y v) + I_{AG}(u,v)\exp(-jP_y v) + I_{AYe}(u,v) + I_{ACy}(u,v)$$

$$I_{Y2}(u,v) = I_{AMg}(u,v) + I_{AG}(u,v) + I_{AYe}(u,v)\exp(-jP_y v) + I_{ACy}(u,v)\exp(-jP_y v)$$

wherein "u" is an angular spatial frequency in a horizontal direction, "v" is an angular spatial frequency in a vertical direction, and "j" is an imaginary unit, the spectra of the luminance signals of the first and second fields are as follows. Namely, $$\begin{aligned} Y_1(u,v) &= I_{Y1}(u,v) * \{S_0(u,v)(1 + \exp(-jP_x u))(1 + \exp(-j2P_y v))\} \\ &= I_{Y1}(u,v) * \{S_0(u,v) 4\exp(-jP_x u/2)\exp(-jP_y v) \cdot \cos(P_x u/2)\cos(P_y v)\} \end{aligned} \quad (4)$$

$$\begin{aligned} Y_2(u,v) &= I_{Y2}(u,v) * \{S_0(u,v)\exp(-jP_y v))(1 + \exp(-j2P_x u))\} \cdot (1 + \exp(-j2P_y v))\} \\ &= I_{Y2}(u,v) * \{S_0(u,v) 4\exp(-jP_x u/2)\exp(-j2P_y v) \cdot \cos(P_x u/2)\cos(P_y v)\} \end{aligned} \quad (5)$$

wherein $S_0(u,v)$ is a spectrum of the fundamental sampling series $S_0(x,y)$, and $S_0(u,v) = (1/8P_x P_y) \Sigma_m \Sigma_n \delta(u - 2\pi m/2p_x, v - 2\pi n/4P_y)$. The reference "*" means a convolution integral.

Figure 6:
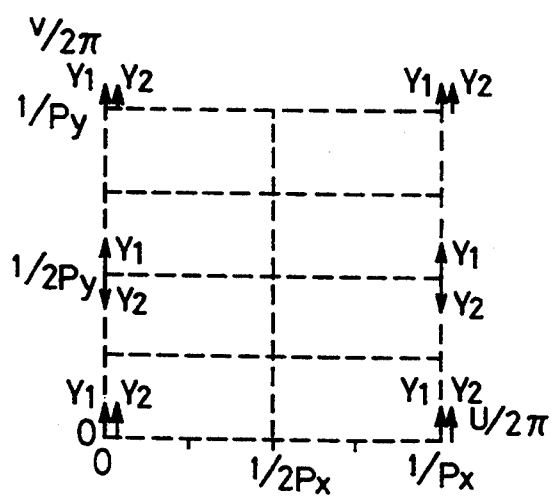
FIG. 6 is a diagram showing a spectral distribution of a luminance signal.

It is understood from equations (4) and (5) that, in the spectrum of the luminance signal, components 1/2Px, 1/4Py and 3/4Py vanish, the spectra of ($I_{Y1}(u,v) + I_{Y2}(u,v)$) are convoluted (the convolution integral) at 0, 1/Px and 1/Py, and the spectra of ($I_{Y1}(u,v) - I_{Y2}(u,v)$) are convoluted at 1/2Py. Therefore, the spectrum of the luminance signal are as shown in FIG. 6. Note, in FIG. 6, the abscissa indicates the spatial frequency in a horizontal direction, and the ordinate indicates the spatial frequency in a vertical direction.

As shown in FIG. 6, regarding the horizontal direction, a sideband component of the signal ($I_{Y1}(u,v) + I_{Y2}(u,v)$) occurs at 1/Px, and regarding the vertical direction, a sideband component of signal ($I_{Y1}(u,v) - I_{Y2}(u,v)$) occurs at 1/2Py. Note, the amplitude of the sideband at 1/2Py is small, and in case of a frequency v=2 πm/Py ("m" is an integer) such as a case in which the image distribution $I_A(x,y)$ is flat (or uniform), or in case in which the value "Mg+G" is equal to the value "Ye+Cy", $I_{Y1} = I_{Y2}$. Therefore, in these cases, the sideband components vanish.

A spectrum of the R-signal is obtained in a fashion similar to the luminance signal. Namely, supposing that an output of each LSE of the first and second CCDs 22 and 23 is equal to each other, and if the R-signal components of the first and second fields are set as follows:

$$I_{R1}(u,v) = I_{AMg}(u,v)\exp(-jP_y v) - \alpha I_{AG}(u,v)\exp(-jP_y v) + I_{AYe}(u,v) - \alpha I_{ACy}(u,v)$$

$$I_{R2}(u,v) = I_{AMg}(u,v) - \alpha I_{AG}(u,v) + I_{AYe}(u,v)\exp(-jP_y v) - \alpha I_{ACy}(u,v)\exp(-jP_y v)$$

the spectra of the R-signal of the first and second fields are $$\begin{aligned} R_1(u,v) &= I_{R1}(u,v) * \{S_0(u,v)(1 + \exp(-jP_x u))(1 + \exp(-j2P_y v))\} \\ &= I_{R1}(u,v) * \{S_0(u,v) 4\exp(-jP_x u/2)\exp(-jP_y v) \cdot \cos(P_x u/2)\cos(P_y v)\} \end{aligned} \quad (6)$$

$$\begin{aligned} R_2(u,v) &= I_{R2}(u,v) * \{S_0(u,v)\exp(-jP_y v)(1 + \exp(-jP_x u)) \cdot (1 + \exp(-j2P_y v))\} \\ &= I_{R2}(u,v) * \{S_0(u,v) 4\exp(-jP_x u/2)\exp(-j2P_y v) \cdot \cos(P_x u/2)\cos(P_y v)\} \end{aligned} \quad (7)$$

It is understood from equations (6) and (7) that the spectrum of the R-signal occurs at the same points as the luminance signal (FIG. 7(a)). In case of a frequency v=2 πm/Py ("m" is an integer) such as a case in which the image distribution $I_A(x,y)$ is flat (or uniform), or in the case in which the value "Mg−αG" is equal to the value "Ye−αCy", $I_{R1} = I_{R2}$. Therefore, in these cases, the component of 1/2Py vanishes similar to the luminance signal, by the interlace in which each of horizontal scanning lines of the first field is formed between horizontal scanning lines of the second field.

A spectrum of the B-signal is also obtained in a fashion similar to the luminance signal. Namely, supposing that an output of each LSE of the first and second CCDs 22 and 23 is equal to each other, and if the B-signal components of the first and second fields are as follows:

$$I_{B1}(u,v) = I_{AMg}(u,v)\exp(-jP_y v) - \beta I_{AG}(u,v)\exp(-jP_y v) - \beta I_{AYe}(u,v) + I_{ACy}(u,v)$$

$$I_{B2}(u,v) = I_{AMg}(u,v) - \beta I_{AG}(u,v) - \beta I_{AYe}(u,v)\exp(-jP_y v) + I_{ACy}(u,v)\exp(-jP_y v)$$

the spectra of the B-signal of the first and second fields are $$\begin{aligned} B_1(u,v) &= I_{B1}(u,v) * \{S_0(u,v)(1 + \exp(-jP_x u))(1 + \exp(-j2P_y v))\} \\ &= I_{B1}(u,v) * \{S_0(u,v) 4\exp(-jP_x u/2)\exp(-jP_y v) \cdot \cos(P_x u/2)\cos(P_y v)\} \end{aligned} \quad (8)$$

$$\begin{aligned} B_2(u,v) &= I_{B2}(u,v) * \{S_0(u,v)\exp(-jP_y v)(1 + \exp(-jP_x u)) \cdot (1 + \exp(-j2P_y v))\} \\ &= I_{B2}(u,v) * \{S_0(u,v) 4\exp(-jP_x u/2)\exp(-j2P_y v) \cdot \cos(P_x u/2)\cos(P_y v)\} \end{aligned} \quad (9)$$

It is understood from equations (8) and (9) that, similar to the R-signal, the spectrum of the B-signal occurs at the same points as the luminance signal (FIG. 7(b)). In case of a frequency v=2 πm/Py ("m" is an integer)

such as a case in which the image distribution $I_A(x,y)$ is flat (or uniform), or in the case in which the value "$Mg-\beta G$" is equal to the value "$-\beta Ye+Cy$", $I_{B1}=I_{B2}$. Therefore, in these cases, the component of 1/2Py vanishes due to the interlace, similar to the luminance signal.

A spectrum of the G-signal is obtained by a manner similar to the above. Namely, supposing that an output of each LSE of the first and second CCDs 22 and 23 is equal to each other, and if the G-signal components of the first and second fields are as follows:

$$I_{G1}(u,v) = I_{Y1}(u,v) - I_{R1}(u,v) - I_{B1}(u,v)$$
$$= -I_{AMg}(u,v)\exp(-jP_y v) +$$
$$(1 - \alpha - \beta)I_{AG}(u,v)\exp(-jP_y v) +$$
$$(2 - \beta)I_{AYe}(u,v) + (2 - \alpha)I_{ACy}(u,v)$$

$$I_{G2}(u,v) = I_{Y2}(u,v) - I_{R2}(u,v) - I_{B2}(u,v)$$
$$= -I_{AMg}(u,v) - (1 - \alpha - \beta)I_{AG}(u,v) +$$
$$(2 - \beta)I_{AYe}(u,v) \cdot$$
$$\exp(-jP_y v) + (2 - \alpha)I_{ACy}(u,v)\exp(-jP_y v)$$

the spectra of the G-signal of the first and second fields are $$G_1(u,v) = I_{G1}(u,v)^* \{S_o(u,v)(1 + \exp(-jP_x u))(1 + \exp(-j2P_y v))\} \quad (10)$$
$$= I_{G1}(u,v)^*\{S_o(u,v)4\exp(-jP_x u/2)\exp(-jP_y v) \cdot \cos(P_x u/2)\cos(P_y v)\}$$

$$G_2(u,v) = I_{G2}(u,v)^*\{S_o(u,v)\exp(-jP_y v)(1 + \exp(-jP_x u)) \cdot \quad (11)$$
$$(1 + \exp(-j2P_y v))\}$$
$$= I_{G2}(u,v)^*\{S_o(u,v)4\exp(-jP_x u/2)\exp(-j2P_y v) \cdot \cos(P_x u/2)\cos(P_y v)\}$$

It is understood from equations (10) and (11) that, similar to the R-signal and the B-signal, the spectrum of the G-signal occurs at the same points as the luminance signal (FIG. 7(c)). In case of a frequency $v = 2\pi m/Py$ ("m" is an integer) such as a case in which the image distribution $I_A(x,y)$ is flat (or uniform), or in the case in which the value "$-Mg+(1-\alpha-\beta)G$" is equal to the value "$(2-\alpha)Cy$", $I_{G1}=I_{G2}$. Therefore, in these cases, the component of 1/2Py vanishes due to the interlace, similar to the luminance signal.

Figure 7:
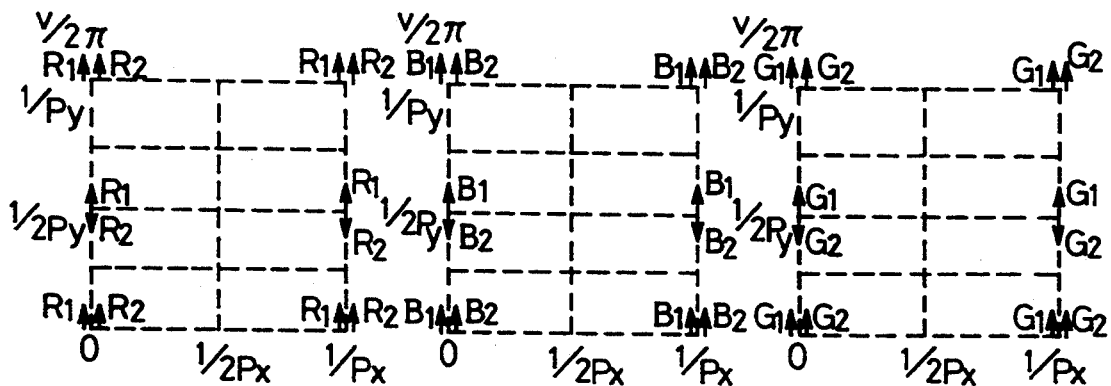
FIGS. 7(a)–7(c) are diagrams showing spectral distributions of color signals in the first embodiment.
Figure 8:
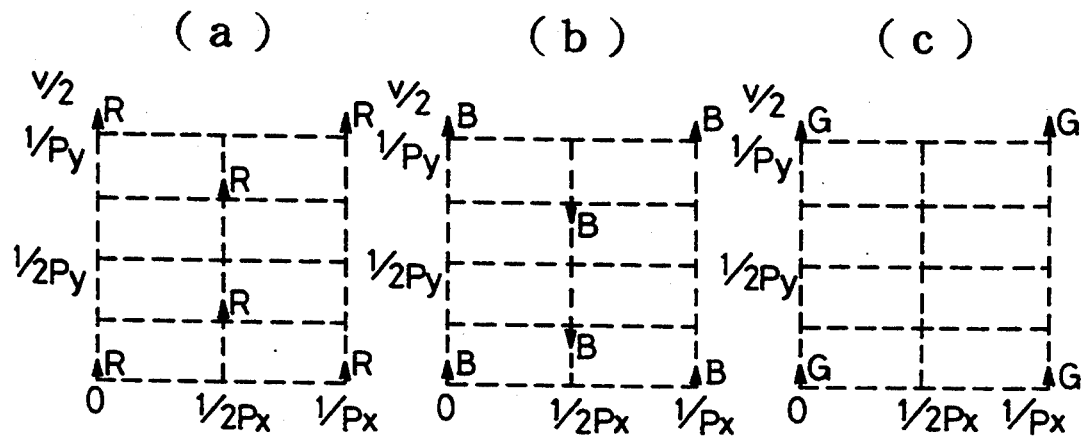
FIGS. 8(a)–8(c) are diagrams showing spectral distributions of color signals in a comparison example.

The spectrum of each color signal of the embodiment shown in FIG. 7 is compared with a spectrum in the case in which a color filter of the G-and-R/B system shown in FIG. 1 is used, as follows:

FIG. 8 shows a result of analysis in which a spectrum in case of using filters of the G-and-R/B system, is analyzed in the same way as described above. As shown in the drawing, in each of the R-signal and the B-signal, a sideband component occurs at the point (1/2Px, 1/4Py). Accordingly, the cut-off frequency of a low pass filter provided for cutting off the sideband components to obtain the fundamental wave component of the color signal is limited to 1/4Px for a horizontal direction and 1/8Py for a vertical direction, according to Nyquist's theorem.

Conversely, according to a construction in which the complementary colors filter with a checkerboard (or matrix) arrangement is provided, in each of the color signals, sideband components occur at the points (1/Px, 0) and (1/2Py, 0) as shown in FIG. 7. Accordingly, the cut-off frequency of a low pass filter provided for obtaining the fundamental wave component of the color signal is lower than 1/2Px for a horizontal direction and 1/4Py for a vertical direction. Namely, according to the embodiment, the cut-off frequency of the low pass filter can be made higher by two times in comparison with the comparison example shown in FIG. 8, whereby the range of the spectrum of the color signals obtained by the CCDs 22 and 23 is broadened in comparison with a conventional device, so that the resolution of the color signals is improved.

Note, regarding the G-signal, a sideband component occurs at (0, 1/2Py) in this embodiment, while a sideband component does not occur at this point in the compared example. However, since the sideband component of the vertical direction vanishes due to the interlace as described above, this does not generate a serious problem.

Figure 9:
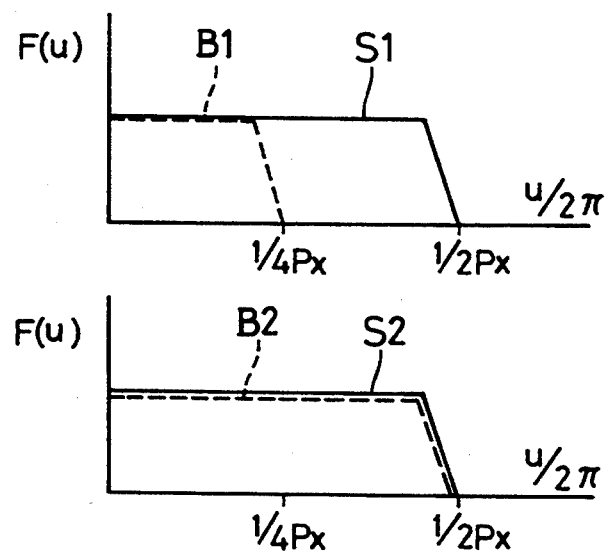
FIG. 9 is a diagram showing spectral ranges of color signals reproduced in the first embodiment and the compared example.

FIG. 9 shows the spectrum ranges of color signals reproduced in the first embodiment and the compared example. As understood from this drawing, although the spectrum range of the color signal is limited to 1/4Px, as shown by the broken line B1, in the comparison example, the spectrum range is increased to 1/2Px, as shown by the broken line B2. On the other hand, the spectrum ranges of the luminance signals are the same in the compared example and the first embodiment, as shown by the solid lines S1 and S2.

Figure 10:
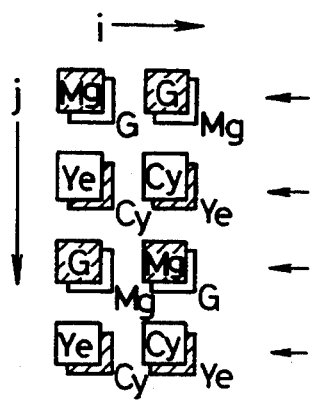
FIG. 10 is a diagram showing a manner of sensing color signals.

With reference to FIG. 10, a practical way of sensing the R-signal, the G-signal and the B-signal is described below. Note, in this embodiment, a frame image is formed according to the frame mode, in which one frame is composed of a first field and a second field.

In the LSE arrangement shown in this drawing, the first and second CCDs 22 and 23 are indicated by the parameters "A" and "B", respectively, the horizontal direction is indicated by the parameter "i", and the vertical direction is indicated by the parameter "j". Note, in this drawing, an LSE positioned at an upper side of the superposed LSEs corresponds to the first CCD 22, and an LSE positioned at a lower side of the superposed LSEs corresponds to the second CCD 23. In the first CCD 22, the LSEs are arranged in such a manner that signals correspond to the LSEs as follows:

$VA, i, j = Mg, \quad VA, i+1, j = G$ $VA, i, j+1 = Ye, \quad VA, i+1, j+1 = Cy$ $VA, i, j+2 = G, \quad VA, i+1, j+2 = Mg$ $VA, i, j+3 = Ye, \quad VA, i+1, j+3 = Cy$ wherein VA, i, j etc. are LSE signals, and $i = 1,3,5, \ldots$; $j = 1,5,9, \ldots$. In the second CCD 23, the LSEs are arranged in such a manner that signals correspond to the LSEs as follows:

$VB, i, j = G, \quad VB, i+1, j = Mg$ $VB, i, j+1 = Cy, \quad VB, i+1, j+1 = Ye$ $VB, i, j+2 = Mg, \quad VB, i+1, j+2 = G$ $VB, i, j+3 = Cy, \quad VB, i+1, j+3 = Ye$ wherein VB, i, j etc. are LSE signals, and i=1,3,5, ... ; j=1,5,9, ...

In a first scanning, signals of the first field, namely $$VA, i, j = Mg, \quad VA, i+1, j = G$$

$$VA, i, j+2 = G, \quad VA, i+1, j+2 = Mg$$

$$VB, i, j = G, \quad VB, i+1, j = Mg$$

$$VB, i, j+2 = Mg, \quad VB, i+1, j+2 = G$$

are sensed, and in a second scanning, signals of the second field, namely $$VA, i, j+1 = Ye, \quad VA, i+1, j+1 = Cy$$

$$VA, i, j+3 = Ye, \quad VA, i+1, j+3 = Cy$$

$$VB, i, j+1 = Cy, \quad VB, i+1, j+1 = Ye$$

$$VB, i, j+3 = Cy, \quad VB, i+1, j+3 = Ye$$

are sensed.

All the LSE signals obtained by the first scan and the second scan are stored in the image memories 41 through 44. These signals are read and inputted into the image signal processing circuit 46. Thus, the R-signal, the G-signal and the B-signal of the number "i" pixel of each scanning line of the odd number field are obtained by a calculation, as follows:

$$
\begin{aligned}
R_{i,k} &= (VA,i,j + VA,i,j+1) - \alpha(VB,i,j + VB,i,j+1) \\
&= (Mg + Ye) - \alpha(G + Cy)
\end{aligned}
\quad (12)
$$

$$
\begin{aligned}
R_{i,k}+1 &= (VB,i,j+2 + VA,i,j+3) - \\
&\quad \alpha(VA,i,j+2 + VB,i,j+3) \\
&= (Mg + Ye) - \alpha(G + Cy)
\end{aligned}
\quad (13)
$$

$$
\begin{aligned}
B_{i,k} &= (VA,i,j + VA,i,j+1) - \beta(VB,i,j + VB,i,j+1) \\
&= (Mg + Ye) - \beta(G + Cy)
\end{aligned}
\quad (14)
$$

$$
\begin{aligned}
B_{i,k}+1 &= (VB,i,j+2 + VA,i,j+3) - \\
&\quad \beta(VA,i,j+2 + VB,i,j+3) \\
&= (Mg + Ye) - \beta(G + Cy)
\end{aligned}
\quad (15)
$$

$$
\begin{aligned}
G_{i,k} &= (VA,i,j + VA,i,j+1 + VB,i,j + VB,i,j+1) - \\
&\quad pR_{i,k} - qB_{i,k} \\
&= (Mg + Ye + G + Cy) - pR_{i,k} - qB_{i,k}
\end{aligned}
\quad (16)
$$

$$
\begin{aligned}
G_{i,k}+1 &= (VB,i,j+2 + VA,i,j+3 + \\
&\quad VA,i,j+2 + VB,i,j+3) - \\
&\quad pR_{i,k}+1 - qB_{i,k}+1 \\
&= (Mg + Ye + G + Cy) - \\
&\quad pR_{i,k}+1 - qi,B_k+1
\end{aligned}
\quad (17)
$$

Similarly, the R-signal, the G-signal and the B-signal of the number "i+1" pixel of each scanning line of the odd number field gamma correction is not carried out. Conversely, when signals on which the gamma correction have been carried out are stored in the memories 41 through 44, the signals are converted to linear signals, and thus, the calculations of the above equations are carried out, and then, the gamma correction is carried out.

Figure 11:
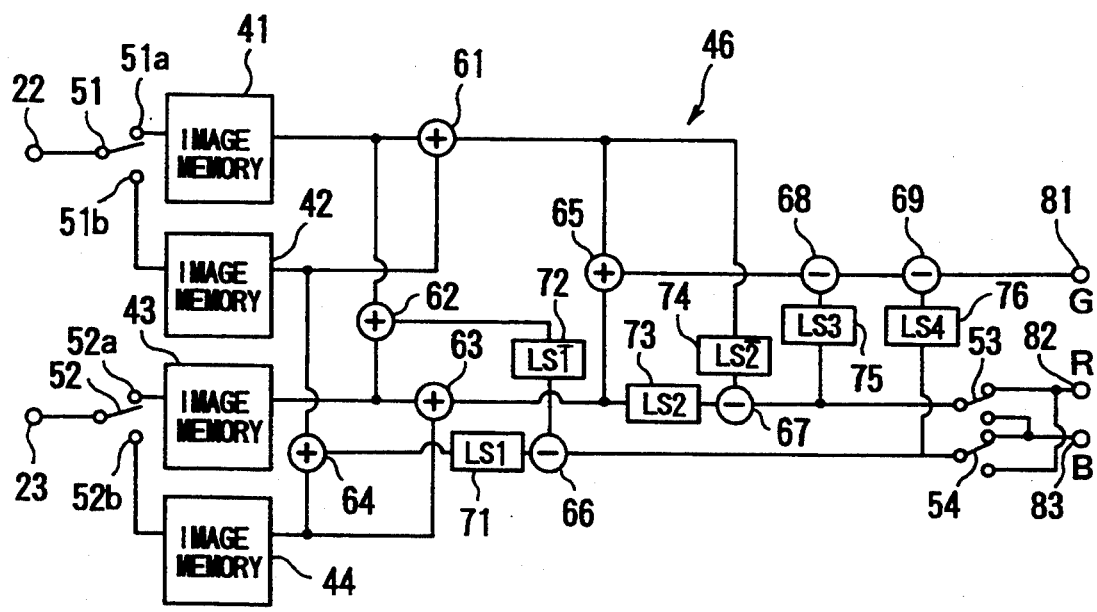
FIG. 11 is a diagram showing an example of an image signal processing circuit.

FIG. 11 shows an example of an operational circuit for carrying out the above described calculations by which the R-signal, the G-signal and the B-signal are obtained. The operational circuit is provided in the image signal processing circuit 46.

An output signal from the first CCD 22 is inputted into one of the image memories 41 and 42 through a switch 51, and an output signal of the second CCD 23 is inputted into one of the image memories 43 and 44 through a switch 52. The switches 51 and 52 are controlled by the system control circuit 10. When image signals of the first field are inputted, switches 51 and 52 are turned to terminals 51a and 52a, and when image signals of the second field is inputted, switches 51 and 52 are turned to terminals 51b and 52b. Namely, the image signals of the first field are stored in the image memories 41 and 43, and the image signals of the second field are stored in the image memories 42 and 44.

The signals read out from the image memories 41 through 44 are subjected to calculations by some of the adders 61 through 65, subtractors 66 through 69, and level shift circuits 71 through 76, so that the R-signal, the G-signal and the B-signal are obtained. The G-signal is outputted through a G-terminal 81, and the R-signal are obtained by a calculation, as follows:

$$
\begin{aligned}
R_{i+1,k} &= (VB,i+1,j + VB,i+1,j+1) - \\
&\quad \alpha(VA,i+1,j + VA,i+1,j+1) \\
&= (Mg + Ye) - \alpha(G + Cy)
\end{aligned}
\quad (18)
$$

$$
\begin{aligned}
R_{i+1,k}+1 &= (VB,i+1,j + VB,i+1,j+3) - \\
&\quad \alpha(VB,i+1,j+2 + VA,i+1,j+3) \\
&= (Mg + Ye) - \alpha(G + Cy)
\end{aligned}
\quad (19)
$$

$$
\begin{aligned}
B_{i+1,k} &= (VB,i+1,j + VA,i+1,j+1) - \\
&\quad \beta(VA,i+1,j + VB,i+1,j+1) \\
&= (Mg + Cy) - \beta(G + Ye)
\end{aligned}
\quad (20)
$$

$$
\begin{aligned}
B_{i+1,k}+1 &= (VA,i+1,j+2 + VA,i+1,j+3) - \\
&\quad \beta(VB,i+1,j+2 + VB,i+1,j+3) \\
&= (Mg + Cy) - \beta(G + Ye)
\end{aligned}
\quad (21)
$$

$$
\begin{aligned}
G_{i+1,k} &= (VB,i+1,j + VB,i+1,j+1 + \\
&\quad VA,i+1,j + VA,i+1,j+1) - \\
&\quad pR_{i+1,k} - qB_{i+1,k} \\
&= (Mg + Ye + G + Cy) - \\
&\quad pR_{i+1,k} - qB_{i+1,k}
\end{aligned}
\quad (22)
$$

$$
\begin{aligned}
G_{i+1,k}+1 &= (VA,i+1,j+2 + VB,i+1,j+3 + \\
&\quad VB,i+1,j+2 + VA,i+1,j+3) - \\
&\quad pR_{i+1,k}+1 - qB_{i+1,k}+1 \\
&= (Mg + Ye + G + Cy) - \\
&\quad pR_{i+1,k}+1 - qB_{i+1,k}+1
\end{aligned}
\quad (23)
$$

Note, with reference to equation (3), "p" and "q" may be "1", respectively. However, it is preferable that these parameters can be adjusted to a proper value in accordance with the luminance component.

The constants "α", "β", "p" and "q" are set by adjusting a parameter in the software executed by the system control circuit 10.

Regarding the even number field, the R-signal, the G-signal and the B-signal are obtained by equations similar to equations (12) through (23) with combining LSEs numbered "j+1" and "j+2".

Note, the above equations show a linear calculation in which and the B-signal are outputted through an R-terminal 82 or a B-terminal 83 through switches 53 and 54. Calculations by the operational circuit shown in FIG. 11 are carried out according to equations (12) through (23), and an operation of this operational circuit is described below, as an example of equation (12).

First, switches 51 and 52 are turned to terminals 51a and 52a, respectively, and thus, a magenta signal (VA,i,j) of the first field is stored in the image memory 41, and a green signal (VB,i,j) of the first field is stored in the image memory 43. Then, switches 51 and 52 are turned to terminals 51b and 52b, respectively, and thus, a yellow signal (VA,i,j+1) of the second field is stored in the image memory 42, and a cyan signal (VB,i,j+1) of the second field is stored in the image memory 44.

The magenta signal (VA,i,j) of the first field and the yellow signal (VA,i,j+1) of the second field are added to each other by adder 61. The green signal (VB,i,j) of the first field and the cyan signal (VB,i,j+1) of the second field are added to each other by adder 63. The output signal of adder 61 is multiplied by a coefficient "1" by level shift circuit 74, and the output signal of adder 63 is multiplied by a coefficient "α" by level shift circuit 73. The output signal of level shift circuit 73 is subtracted from the output signal of level shift circuit 74 by subtractor 67. Thus, equation (12) is carried out. At this time, switch 53 is turned to the R-terminal 82, so that the R-signal is outputted through the R-terminal 82.

Note, the level shift amounts in the level shift circuits 71 through 76 are controlled in accordance with the content of the calculation by the system control circuit 10. Namely, the level shift circuits 71 through 74 are set to "α", "β", or "1", and the level shift circuits 75 and 76 are set to "p" or "q". Switches 53 and 54 are turned to the upper sides in the drawing when the output of the number "i" LSE is calculated, and turned to the lower sides in the drawing when the output of the number "i+1" LSE is calculated.

Figure 12:
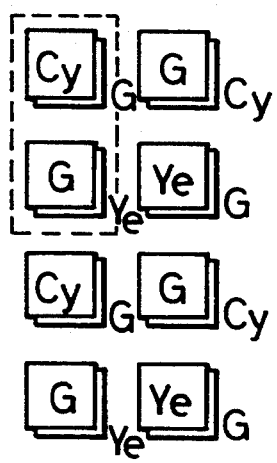
FIG. 12 is a diagram showing another example of the color filter provided in the first embodiment.

FIG. 12 shows another example of the complementary color filter. This filter comprises cyan (Cy), yellow (Ye) and green (G) elements arranged in a regular manner, and does not have megenta elements. In this filter, the B-signal, the R-signal and the G-signal are obtained by the following equations, in accordance with four LSEs enclosed by the broken line in the drawing:

$$B = Cy_1 - (G_1 + G_2)/2$$

$$R = Ye_2 - (G_1 + G_2)/2$$

$$G = (G_1 + G_2)/2$$

wherein the suffix "1" indicates the signal from the LSE on the upper side in the drawing, and the suffix "2" indicates the signal from the LSE on the lower side of the superposed LSEs in the drawing.

The filter shown in FIG. 12 allows almost the same effect to be obtained as in the case in which the complementary color filter with a checkerboard arrangement is used. In addition to this effect, the filter shown in FIG. 12 permits the circuit construction to be simplified, since the equations for obtaining the color signals are simple.

According to the above embodiment, since the resolution of the color signals is raised to the same degree as the luminance signal, even when such image signals are inputted into a computer and image processing is carried out for every pixel, there is no deterioration of the image quality. Further, since the embodiment device is a dual-type imaging device, and is provided with filters 51 and 52 having the same constructions, the resolutions of the color signals are improved without enlarging the size of the device and with a simple circuit.

Figure 13:
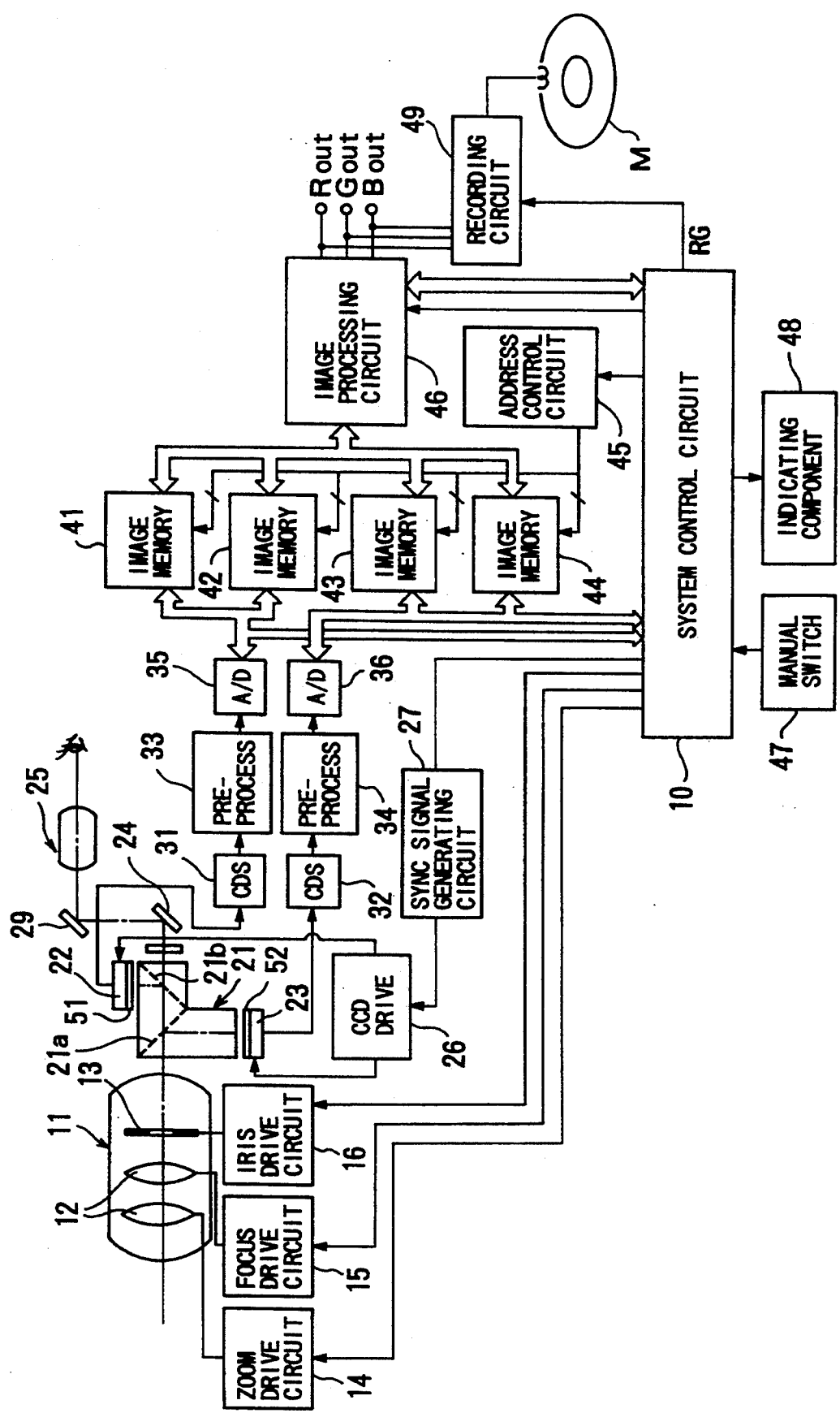
FIG. 13 is a block diagram showing a still-video camera to which a second embodiment of the present invention is applied.

FIG. 13 is a block diagram showing a still-video camera to which a second embodiment of the present invention is applied.

The construction of the still-video camera of the second embodiment is basically the same as that of the first embodiment shown in FIG. 2, except that a recording circuit 49 is provided in the second embodiment. The R-signal, the G-signal and the B-signal outputted from the image signal processing circuit 46 are transmitted to a computer or display device, and also inputted into a recording circuit 49 so that these signals are recorded on a recording medium M, such as a magnetic disk or a memory, through the recording circuit 49.

In the second embodiment, photometry measurement is carried out in accordance with output signals of the first and second CCDs 22 and 23. The photometry measurement in this embodiment, i.e., how the luminance signal is obtained by using the CCDs 22 and 23, is described below.

The photometry measurement is carried out by setting aperture 13 to a predetermined aperture value. LSE signals obtained from the first and second CCDs 22 and 23 are temporarily stored in the image memories 41 through 44 and then processed by the image signal processing circuit 46, in which photometry data is obtained based on the LSE signals. The photometry data is obtained from four LSEs which are arranged in a 2×2 matrix, i.e., a green (G) element, a magenta (Mg) element, a yellow (Ye) element and a cyan (Cy) element are disposed adjacent each other. The photometry data is outputted to the system control circuit 10.

A method by which the luminance signal is calculated is described below.

Similar to a sensing operation of the R-signal, the G-signal and the B-signal described above with reference to FIG. 10, the LSE signals obtained from the first CCD 22 are $$VA, i, j = Mg, \ VA, i+1, j = G$$

$$VA, i, j+1 = Ye, \ VA, i+1, j+1 = Cy$$

and the LSE signals obtained from the second CCD 23 are $$VB, i, j = G, \ VB, i+1, j = Mg$$

$$VB, i, j+1 = Cy, \ VB, i+1, j+1 = Ye$$

The luminance signals sensed by the first and second CCDs 22 and 23 are:

$$Y_1 = VA, i, j + VA, i, j+1 + VA, i+1, j + VA, i+1, j+1 \quad (24)$$

$$Y_2 = VB, i, j + VB, i, j+1 + VB, i+1, j + VB, i+1, j+1 \quad (25)$$

The luminance signals are obtained by the operational circuit shown in FIG. 11, similar to the R-signal, the G-signal and the B-signal.

Figure 14:
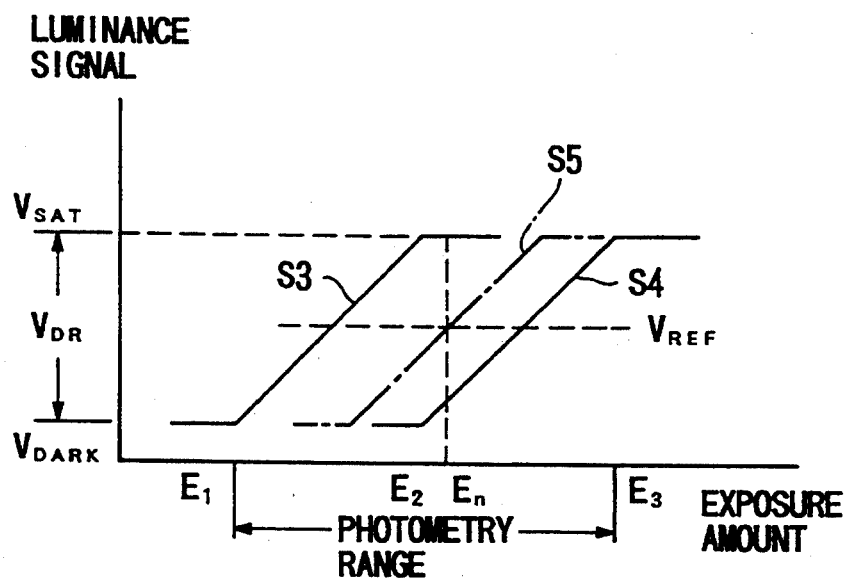
FIG. 14 is a diagram showing an example of a relationship between a photometry range and luminance signals obtained through the first and second CCDs.
Figure 15:
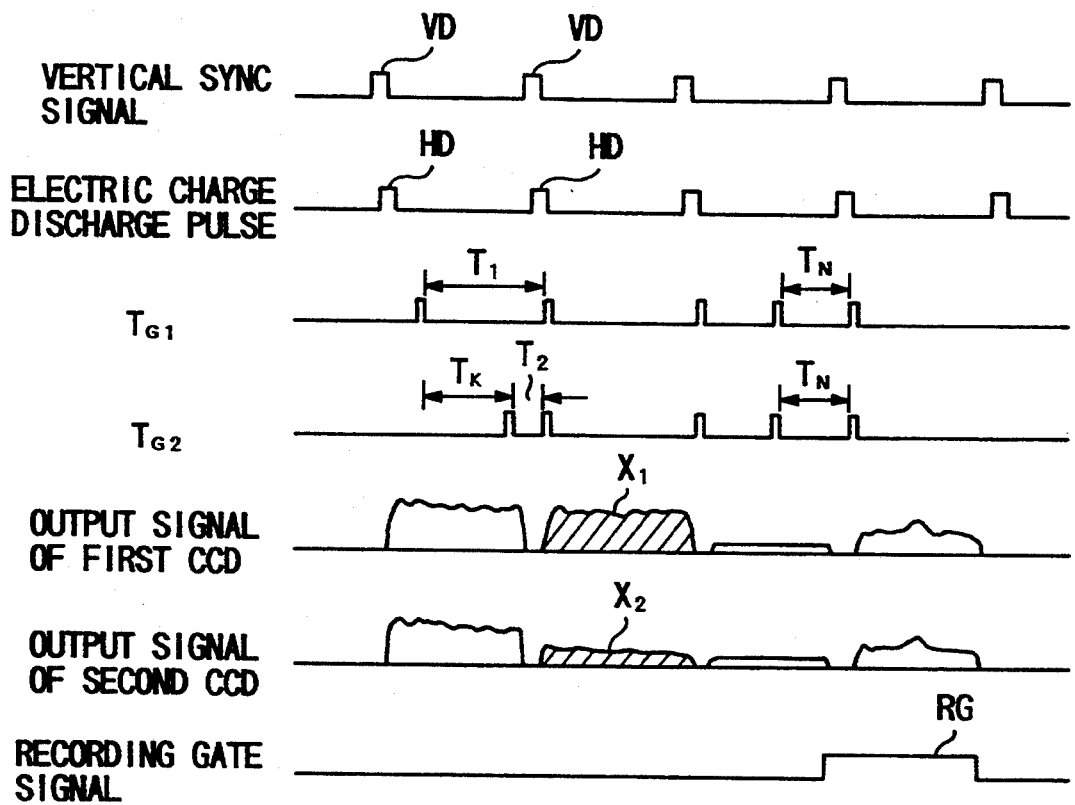
FIG. 15 is a timing chart showing operations of the CCDs in the second embodiment.

In an photometry measurement, the electric charge accumulating time (a shutter time) of the first and second CCDs 22 and 23 are set to different values from each other. Thus, the photometry range of the first and second CCDs 22 and 23 are different. FIG. 14 shows an example of a relationship between the photometry range and the luminance signals obtained through the first and second CCDs 22 and 23. In this drawing, dynamic range $V_{DR}$ of each of the CCDs 22 and 23 is the same. The photometry range of the first CCD 22 is an exposure amount $E_1$ through $E_2$ as shown by the solid line S3, and the photometry range of the second CCD 23 is an exposure amount $E_2$ through $E_3$ as shown by the solid line S4. Namely, the electric charge accumulating time of the first CCD 22 is relatively long, so that relatively little (dark) light can be sensed. Conversely, the electric charge accumulating time of the second CCD 23 is relatively short, so that a relatively bright light can be sensed. By setting the electric charge accumulating times of the first and second CCDs 22 and 23 to different values, the photometry range ($E_1$–$E_3$) is approximately twice that of the case in which only one CCD is used for photometry measurement.

With reference to FIGS. 14 through 17, the photometry measurement and an image capture operation are described. Note, in this embodiment, the aperture value of the aperture 13 is fixed to a predetermined value.

Figure 16:
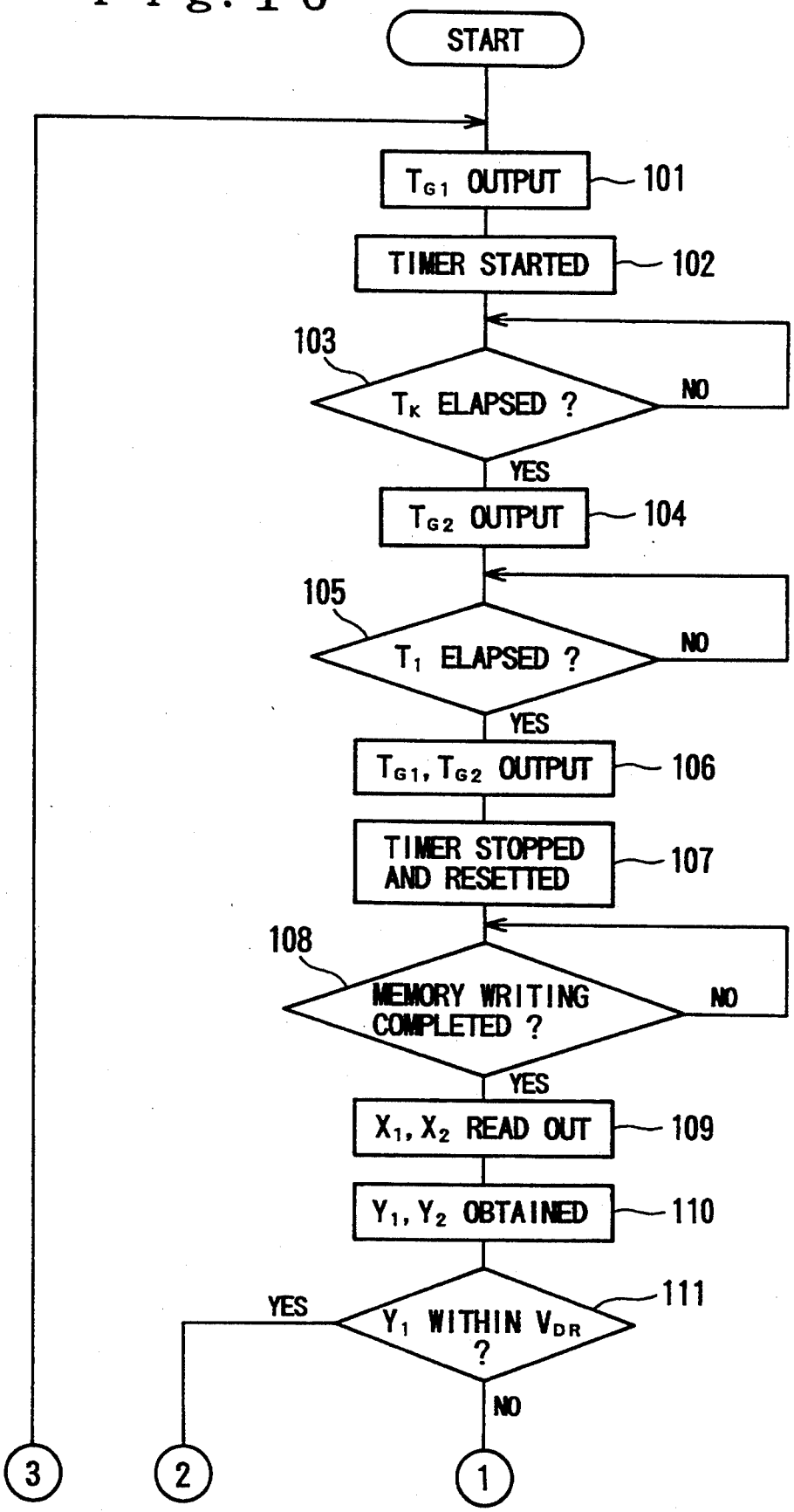
FIG. 16 is a first part of a flowchart of a photometry measurement and an image capturing operation in the second embodiment.

Immediately after a vertical synchonizong signal VD is outputted, an electric charge discharge pulse HD is outputted, so that residual electric charges remaining in the vertical transfer CCDs of the first and second CCDs 22 and 23 are quickly discharged. Referring to FIG. 16, a drive signal $T_{G1}$ for the first CCD 22 is outputted at a predetermined timing in step 101. In Step 102, a timer is started so that a measurement of a time is started, and in Step 103, it is determined whether a time $T_K$ has elapsed since the timer was started in Step 102. When time $T_K$ has elapsed, the process goes from Step 103 to Step 104, and thus a drive signal $T_{G2}$ for the second CCD 23 is outputted. Then, in Step 105, it is determined whether a time $T_1$ has elapsed since the timer was started in Step 102. When time $T_1$ has elapsed, the process goes from Step 105 to Step 106, and thus, the drive signals $T_{G1}$ and $T_{G2}$ are outputted at the same time. Thus, an electric charge is accumulated in the first CCD 22 for the electric charge accumulating time $T_1$, and in the second CCD 23 for the electric charge accumulating time $T_2$ ($=T_1-T_K$). In Step 107, the timer is stopped and reset.

At approximately at the same time that the drive signals $T_{G1}$ and $T_{G2}$ are outputted in Step 106, a reading transfer pulse (not shown in FIG. 15) is outputted, so that electric charges accumulated on the light receiving surface of each of the CCDs 22 and 23 are outputted as image signals. Accordingly, signals $X_1$ and $X_2$ outputted from the CCDs 22 and 23 right after the execution of Step 106 correspond to the luminance signals of pixels of one frame sensed for the electric charge accumulating time $T_1$ and $T_2$ in Steps 101 through 106. Output signals $X_1$ and $X_2$ are A-D converted and written in the image memories 41 and 43. Namely, at this time, in the output signals of the first and second CCDs 22 and 23, only the signals corresponding to the first field are written in the image memories 41 and 43.

In Step 108, it is determined whether the writing operations of the output signals of the CCDs 22 and 23 to the image memories 41 and 43 are completed. When the writing operations are completed, the process goes to Step 109.

In Step 109, signals $X_1$ and $X_2$ are read out from the image memories 41 and 43. In Step 110, based on the signals $X_1$ and $X_2$, a center-point-weighted mean value of the luminance of one frame is obtained. Namely, in each of the signals $X_1$ and $X_2$, a signal corresponding to the central point of one frame is given extra weight, and thus, signals $X_1$ and $X_2$ are integrated with respect to time, to calculate the mean value, whereby photometry data $Y_1$ and $Y_2$ are obtained. Namely, photometry data $Y_1$ is a mean value of the luminances of pixels sensed by the first CCD 22 but with extra weight being given to the luminance of the center pixel of one frame, and photometry data $Y_2$ is a means value of the luminance pixels sensed by the second CCD 23 with extra weight being gived to the luminance of the center pixel of one frame.

As described above, charge accumulating time $T_1$ is longer than charge accumulating time $T_2$. Therefore, photometry data $Y_1$ sensed by the first CCD 22 is larger than photometry data $Y_2$ sensed by the second CCD 23.

In Step 111, it is determined whether the photometry data $Y_1$ is within the dynamic range $V_{DR}$. If the exposure amount En to be measured is within the photometry range $E_2$–$E_3$ of the second CCD 23, as shown in FIG. 14, photometry data $Y_1$ (the solid line S3) is saturated, and out of the dynamic range $V_{DR}$. Therefore, Step 112 is executed, and thus, it is determined whether the photometry data $Y_2$ is within the dynamic range $V_{DR}$. In case of an example shown in FIG. 14, since the photometry data $Y_2$ (the solid line S4) is within the the dynamic range $V_{DR}$, Steps 113 and 114 are executed, to carry out an adjustment of the electric charge accumulating time.

In Step 113, reference value $V_{REF}$ which is within the dynamic range $V_{DR}$ is divided by the photometry data $Y_2$, to obtain a correction coefficient $\Delta T$. Note that the reference value $V_{REF}$ is a fixed value which is predetermined in accordance with the characteristics of the CCDs 22 and 23. In Step 114, the correction coefficient $\Delta T$ is multiplied by the electric charge accumulating time $T_2$ to obtain a corrected electric charge accumulating time $T_N$ which is common to the first and second CCDs 22 and 23. Namely, the electric charge accumulating times $T_N$ of the first and second CCDs 22 and 23 have the same values. If an exposure is carried out according to the electric charge accumulating time $T_N$ the relationship between the photometry data $Y_1$ and $Y_2$ of the first and second CCDs 22 and 23 and the exposure amount has a characteristic shown by the chained line S5 (FIG. 14).

In Step 115, the drive signals $T_{G1}$ and $T_{G2}$ are outputted at the same time. In Step 116, a timer is started. In Step 117, a recording gate signal RG is turned ON, and thus, a recording of the image signal, on the recording medium M, becomes possible.

In Step 118, it is determined whether time $T_N$ has elapsed since the timer was started in Step 116. When time $T_N$ has elapsed, in Step 119, drive signals $T_{G1}$ and $T_{G2}$ are outputted at the same time. Thus, electric charges are accumulated in the first and second CCDs 22 and 23 for the electric charge accumulating time $T_N$. The signals corresponding to the electric charges accumulated for the electric charge accumulating time $T_N$ are read out from the CCDs 22 and 23 according to a reading transfer pulse which is outputted at approximately the same time as the drive signals $T_{G1}$ and $T_{G2}$, and then, the signals are A-D converted and written in the image memories 41 through 44. In Step 120, the timer is stopped and reset.

In Step 121, it is determined whether the writing operations of the output signals of the CCDs 22 and 23 to the image memories 41 through 44 are completed. When the writing operations are completed, it is determined in Step 122 whether the writing operations of the image signals to the recording medium M are completed. When this writing operation is completed, the recording gate signal RG is turned OFF in Step 123, and thus, this program is ended.

On the other hand, when it is determined in Step 111 that the photometry data $Y_1$ is not out of the dynamic range $V_{DR}$, Steps 131 and 132 are executed. Thus, the corrected electric charge accumulating time $T_N$ is obtained, similar to Steps 113 and 114, whereby an image capture operation is carried out according to the electric charge accumulating time $T_N$.

If it is determined in Step 112 that the photometry data $Y_2$ is not within the dynamic range $D_{DR}$, the process goes to Step 133, in which the electric charge accumulating times $T_1$ and $T_2$ are changed, and then Step 101 and the following Steps are executed again. Note, when the photometry data $Y_1$ is equal to the minimum value of the dynamic range $V_{DR}$, the electric charge accumulating times $T_1$ and $T_2$ are elongated, and when the photometry data $Y_2$ is equal to the maximum value of the dynamic range $V_{DR}$, the electric charge accumulating times $T_1$ and $T_2$ are shortened.

Note, although the photometry data $Y_1$ and $Y_2$ are calculated by obtaining the center point weighted mean value of the luminance of one frame, instead of this, a mean value of all the luminance signals of one frame can be used to obtain the photometry data $Y_1$ and $Y_2$. Further, the peak value among the luminances of one frame can be used, or only the luminance of the center point of one frame can be used for obtaining the photometry data.

Figure 17:
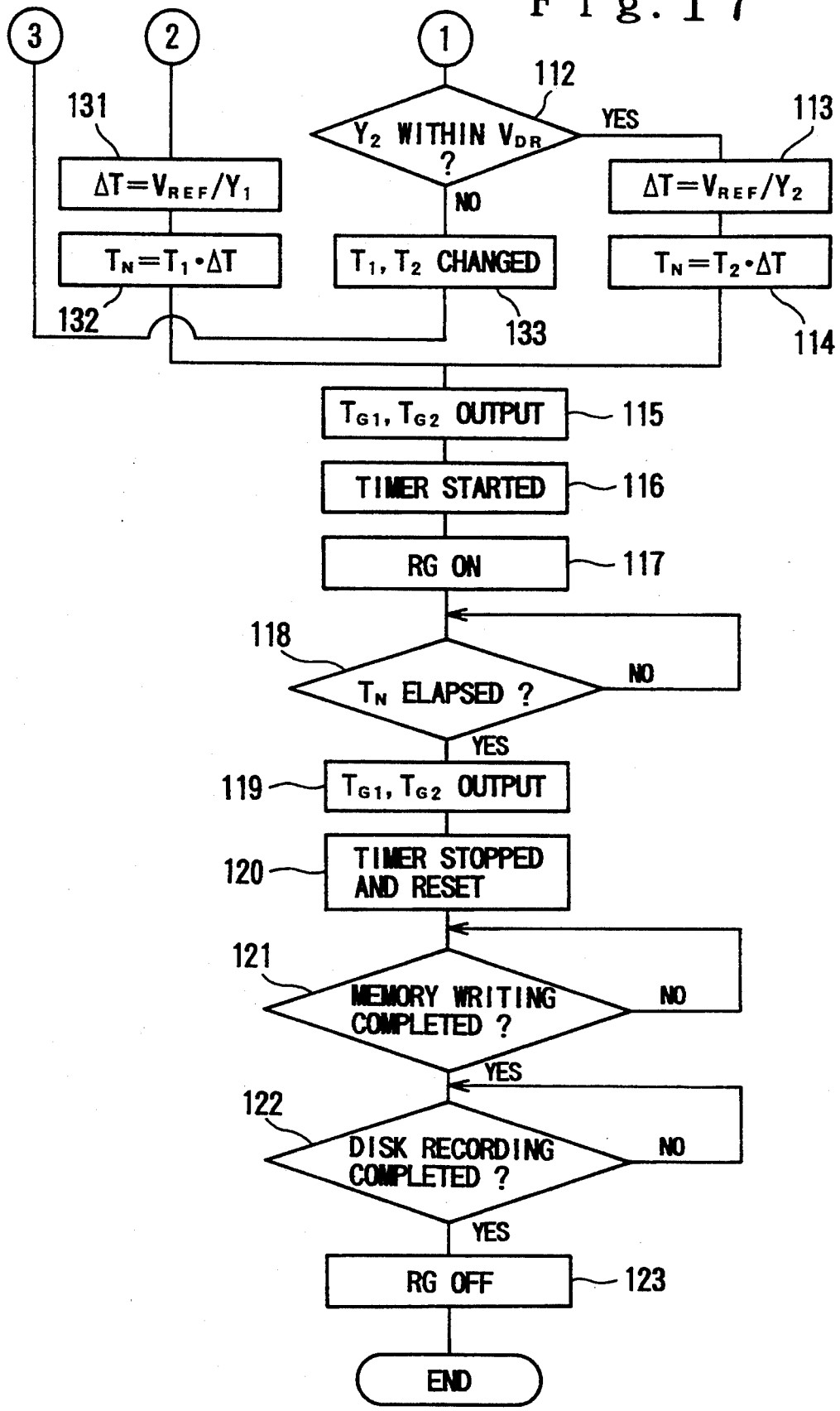
FIG. 17 is a second part of the flowchart of a photometry measurement and an image capturing operation in the second embodiment.

Although the flowchart of FIGS. 16 and 17 show a photometry measurement by controlling the shutter time, the photometry measurement can be carried out by controlling the aperture value of the aperture 13.

As described above, in the second embodiment, the photometry measurement is carried out by using output signals of the CCDs 22 and 23 having the complementary colors filter with a checkerboard arrangement. Therefore, the dynamic range of the photometry measurement can be expanded, so that an exact photometry measurement is carried out in a short time. Thus an exposure setting can be swiftly completed. Further, according to the second embodiment, the photometry measurement can be carried out with a simple construction without providing a daylight measuring device (an external sensor).

In a third embodiment, a still-video camera has basically the same construction as the second embodiment, and each of the CCDs 22 and 23 has a VOD (vertical overflow drain) construction in which a residual electric charge is discharged to the substrate of the CCD.

In the third embodiment, a photometry measurement is carried out in accordance with output signals of the first and second CCDs 22 and 23, similar to the second embodiment. Note, the relationship between the exposure amount and the photometry data $Y_1$ and $Y_2$ of the first and second CCDs 22 and 23 is the same as shown in FIG. 14, which is described as the second embodiment. With reference to FIGS. 14, and 18 through 21, the operation of the third embodiment is described below.

Step 201 is repeatedly carried out until the release switch of the still-video camera is turned ON. When the release switch is turned ON and an ON-signal RL is outputted, the aperture value of the aperture 13 is set to the initial value $AV_1$ in step 202. In Step 203, a coefficient $\alpha$ used in a process executed later is set to "1". In Step 204, an OFF-time of an electric charge discharge pulse $V_{OD1}$ is set to "$\alpha T_1$", and in Step 205, an OFF-time of an electric charge discharge pulse $V_{OD2}$ is set to "$\alpha T_2$".

The electric charge discharge pulses $V_{OD1}$ and $V_{OD2}$ are provided for quickly discharging residual electric charges, which remain in the photodiodes or vertical transfer CCDs of the first and second CCDs 22 and 23, to the substrates of the CCDs. While the electric charge discharge pulses $V_{OD1}$ and $V_{OD2}$ are not outputted, electric charges corresponding to the amount of light received by the CCDs are accumulated on the photodiodes of the first and second CCDs 22 and 23.

Figure 18:
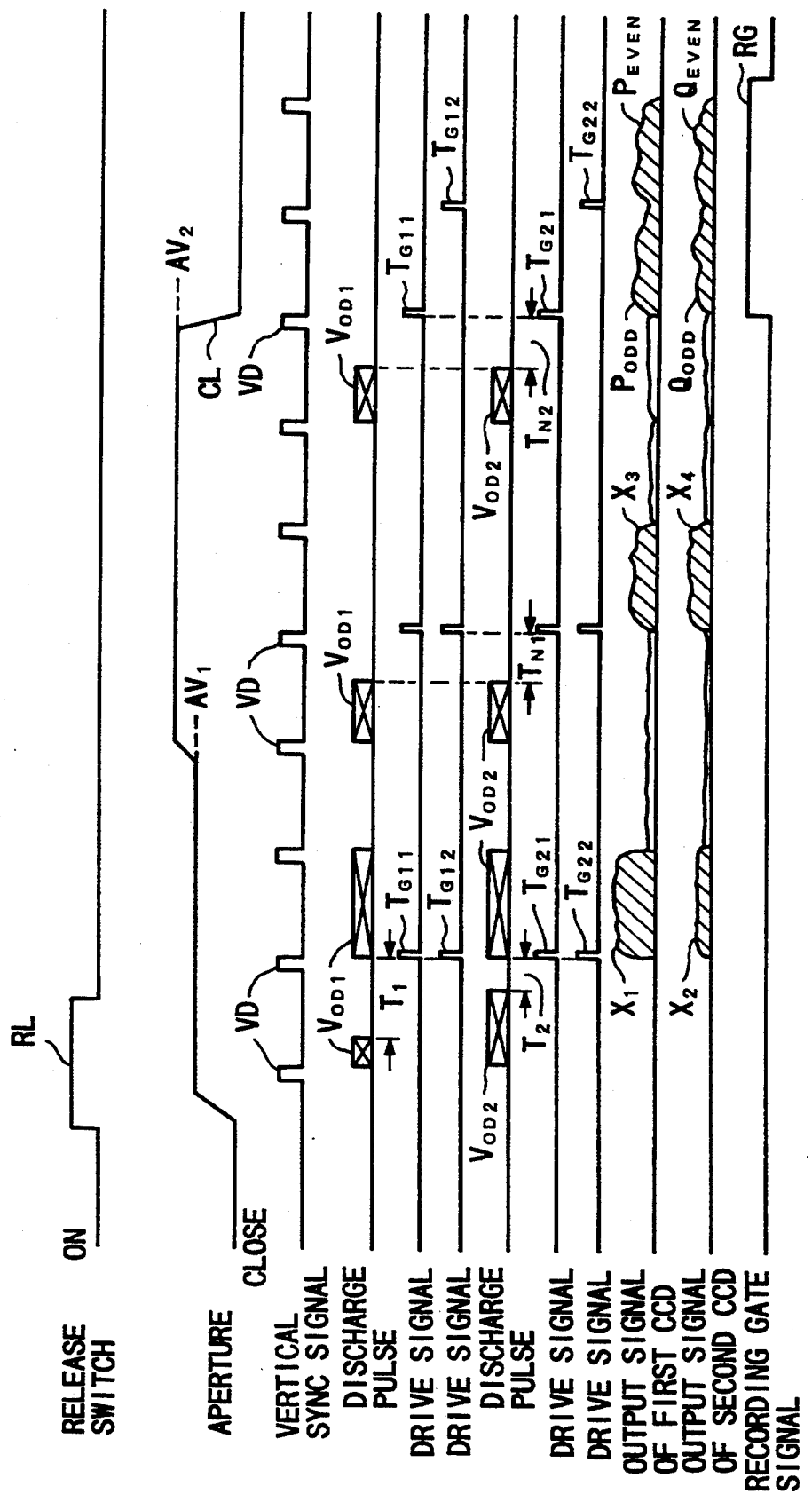
FIG. 18 is a timing chart showing operations of the CCDs in a third embodiment.
Figure 19:
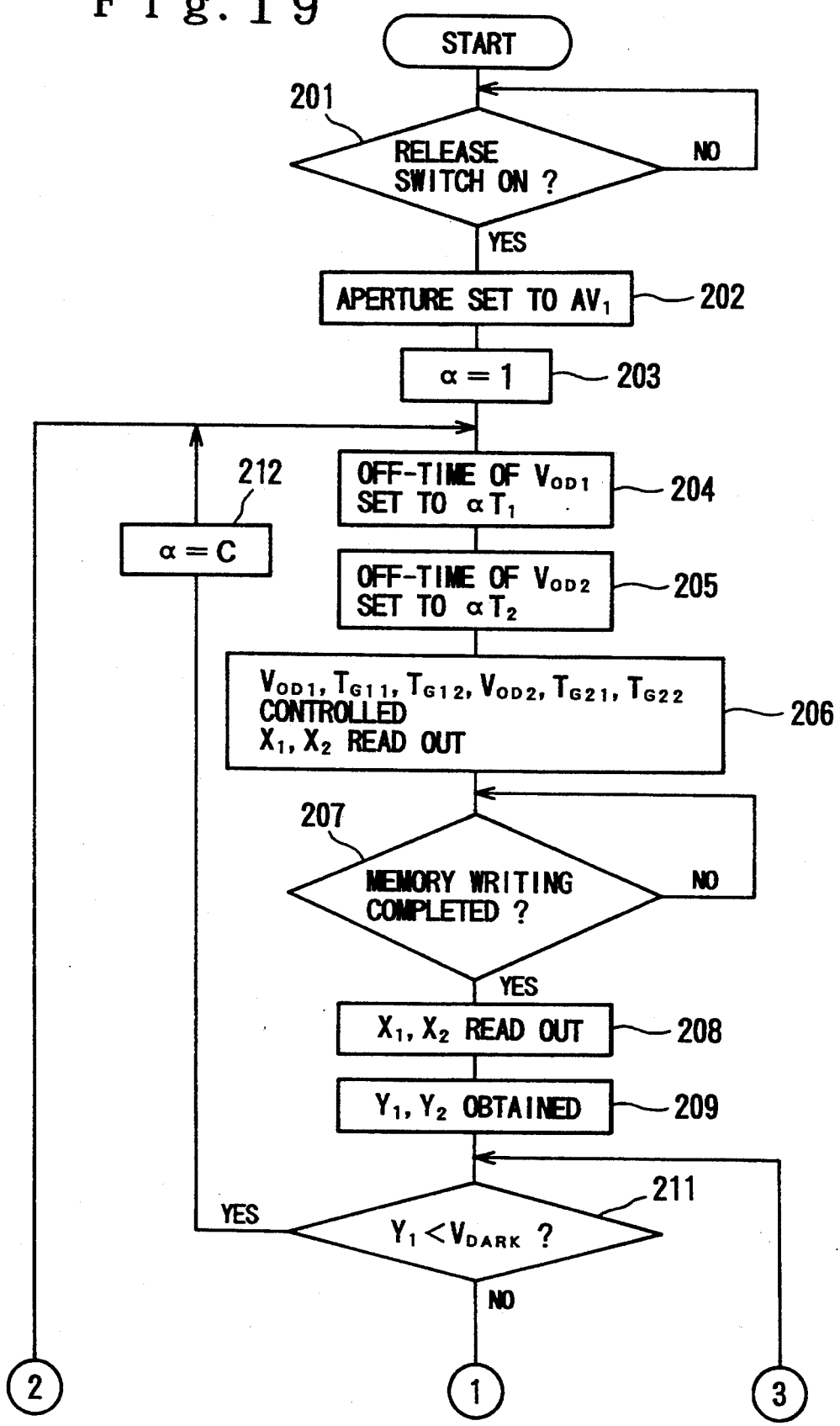
FIG. 19 is the a first part of a flowchart of a photometry measurement and an image capturing operation in the third embodiment.
Figure 20:
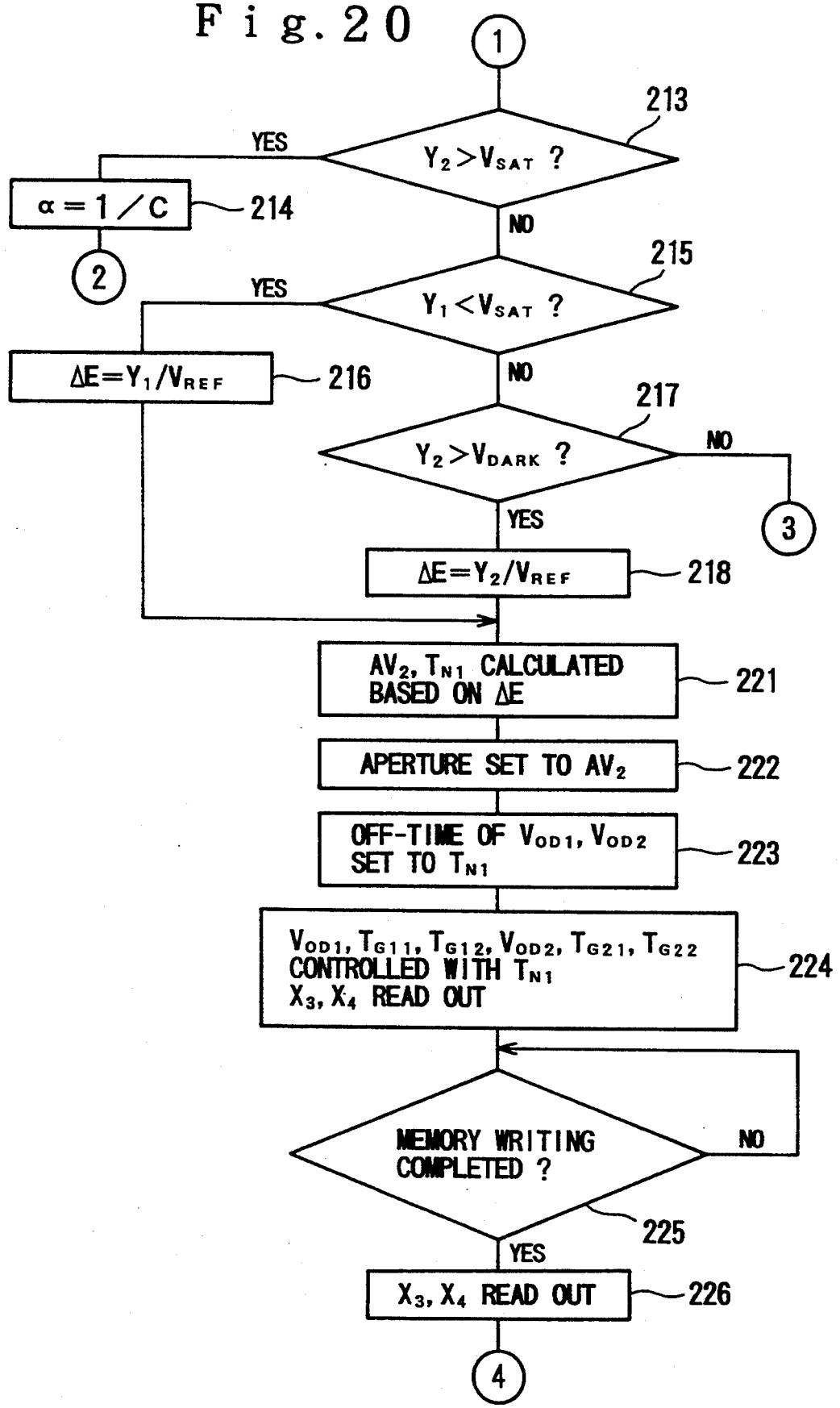
FIG. 20 is a second part of the flowchart of a photometry measurement and an image capturing operation in the third embodiment.
Figure 21:
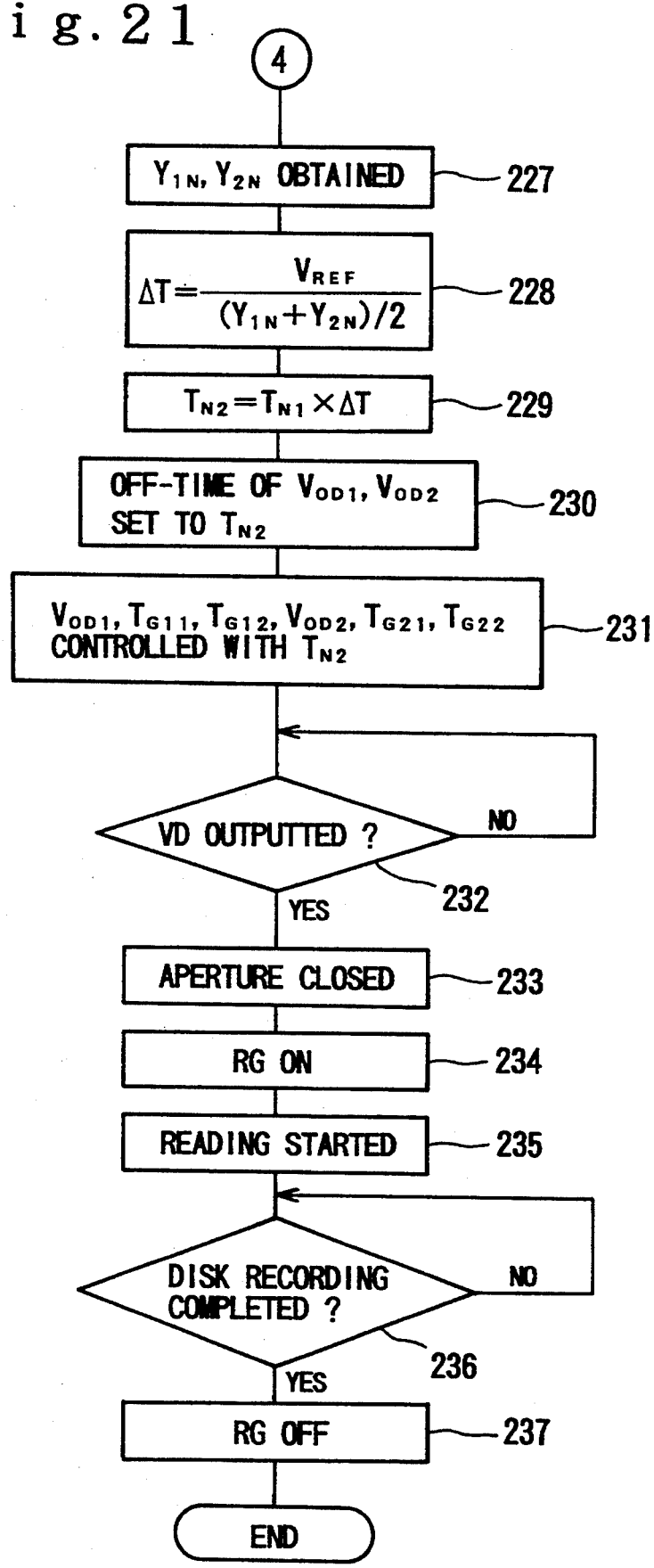
FIG. 21 is a third part of the flowchart of a photometry measurement and an image capturing operation in the third embodiment.

As shown in FIG. 18, the OFF-time $\alpha T_1$ ($\alpha = 1$ in FIG. 18) is a time interval from the fall of the electric charge discharge pulse $V_{OD1}$ to the rise of the drive signal $T_{G11}$, and the OFF-time $\alpha T_2$ ($\alpha = 1$ in FIG. 18) is the time interval from the fall of the electric charge discharge pulse $V_{OD2}$ to the rise of the drive signal $T_{G21}$. Note, the fall of the electric charge discharge pulses $V_{OD1}$ and $V_{OD2}$ occurs at the same time as the fall of the vertical synchronizing signal VD.

Thus, the OFF-times $\alpha T_1$ and $\alpha T_2$ are electric charge accumulating times (shutter times) of the first and second CCDs 22 and 23 in a photometry measurement. A first exposure control signal is produced by stopping the electric charge discharge pulse $V_{OD1}$ for the OFF-time $\alpha T_1$, and a second exposure control signal is produced by stopping the electric charge discharge pulse $V_{OD2}$ for the OFF-time $\alpha T_2$. Namely, when the coefficient $\alpha$ is "1", the first and second exposure control signals are "$T_1$" and "$T_2$", respectively.

In Step 206, the electric charge discharge pulses $V_{OD1}$ and $V_{OD2}$ are controlled in accordance with the OFF-times $\alpha T_1$ and $\alpha T_2$. Namely, the electric charge discharge pulses $V_{OD1}$ and $V_{OD2}$ rise in synchronization with a fall of the vertical synchronizing signal VD, and fall at a timing which is set according to the OFF-times $\alpha T_1$ and $\alpha T_2$. Then, when the OFF-times $\alpha T_1$ and $\alpha T_2$ have elapsed, in accordance with the rises of the drive signals $T_{G11}$ and $T_{G21}$, electric charges accumulated in the photodiodes of the first and second CCDs 22 and 23 are transferred to the vertical transfer CCDs. Then, according to a reading transfer pulse (not shown), the signals $X_1$ and $X_2$ corresponding to the received light amounts are outputted from the CCDs 22 and 23. While the signals $X_1$ and $X_2$ are outputted, the electric charge discharge pulses $V_{OD1}$ and $V_{OD2}$ are outputted, so that residual electric charges remaining in the CCDs 22 and 23 are discharged to the CCD substrates at the same time as the signals $X_1$ and $X_2$ are read out. The signals $X_1$ and $X_2$ are stored in the image memories 41 and 43.

Thus, electric charges are accumulated in the first CCD 22 for the electric charge accumulating time $\alpha T_1$, and in the second CCD 23 for the electric charge accumulating time $\alpha T_2$. The signals $X_1$ and $X_2$ outputted from the CCDs 22 and 23 by the execution of Step 206 correspond to luminance signals for one frame sensed for the electric charge accumulating times $\alpha T_1$ and $\alpha T_2$. In Step 207, it is determined whether the writing operations of signals $X_1$ and $X_2$ to the image memories 41 and 43 are completed. When the writing operations are completed, the process goes to Step 208, in which signals $X_1$ and $X_2$ are read out from the image signals 41 and 43. In Step 209, based on the signals $X_1$ and $X_2$, a center point weighted mean value of the luminance of one frame is calculated, similarly to Step 110 (FIG. 16) of the second embodiment, whereby the photometry data $Y_1$ and $Y_2$ are obtained.

The electric charge accumulating time $\alpha T_1$ is longer than the electric charge accumulating time $\alpha T_2$. Therefore, the photometry data $Y_1$ sensed by the first CCD 22 has a larger value than the photometry data $Y_2$ sensed by the second CCD 23.

In Step 211, it is determined whether the photometry data $Y_1$ is smaller than a minimum value $V_{DARK}$ of the dynamic range $V_{DR}$ (FIG. 11). When the photometry data $Y_1$ is smaller than the minimum value $V_{DARK}$, namely, when the photometry data $Y_1$ is out of the dynamic range $V_{DR}$ (the photometry data $Y_2$ is also out of the dynamic range $V_{DR}$ since the photometry data $Y_2$ is smaller than the photometry data $Y_1$), Step 212 is carried out, so that the coefficient $\alpha$ is set to a predetermined value C which is larger than "1". As a result, the characteristic curves S3 and S4 of the CCDs 22 and 23 shown in FIG. 14 are shifted leftward as a whole, and thus, the CCDs 22 and 23 become able to sense less light. Then, Steps 204 through 207 are executed.

Conversely, if it is determined in Step 211 that the photometry data $Y_1$ is larger than or equal to the minimum Value $V_{DARK}$, it is determined in Step 213 whether the photometry data $Y_2$ is larger than a maximum value $V_{SAT}$. When the photometry data $Y_2$ is larger than the maximum value $V_{SAT}$, namely when the photometry data $Y_2$ is not within the dynamic range $V_{DR}$, Step 214 is executed so that the the coefficient $\alpha$ is set to a predetermined value 1/C. As a result, the characteristic curves S3 and S4 of the CCDs 22 and 23, shown in FIG. 14, are shifted rightward as a whole, and thus, the CCDs 22 and 23 become able to sense brighter light. Then, Step 204 and 207 are again executed.

When it is determined in Step 211 that the photometry data $Y_1$ is larger than or equal to the minimum value $V_{DARK}$ and it is determined in Step 213 that the photometry data $Y_2$ is smaller than the maximum value $V_{SAT}$, the process goes to Step 215, in which it is determined whether the photometry data $Y_1$ is smaller than the maximum value $V_{SAT}$. When the photometry data $Y_1$ is smaller than the maximum value $V_{SAT}$, namely when the photometry data $Y_1$ is within the dynamic range $V_{DR}$, a correction coefficient $\Delta E$ is calculated in Step 216. This correction coefficient $\Delta E$ is obtained by dividing the photometry data $Y_1$ by a reference value $V_{REF}$ which is within the dynamic range $V_{DR}$. Note, the reference value $V_{REF}$ has a fixed value determined in accordance with the characteristics of the CCDs 22 and 23.

On the other hand, if it is determined in Step 215 that the photometry data $Y_1$ is larger than or equal to the maximum value $V_{SAT}$, the process goes to Step 217, in which it is determined whether the photometry data $Y_2$ is larger than the minimum value $V_{DARK}$. Note, if it is determined in Step 217 that the photometry data $Y_2$ is smaller than or equal to the minimum value $V_{DARK}$ an abnormal state has occurred in this process, and thus, the process returns to Step 211, so that the processes described above are executed again. Conversely, if it is determined in Step 217 that the photometry data $Y_2$ is larger than the minimum value $V_{DARK}$, the correction coefficient $\Delta E$ is calculated in Step 218. This correction coefficient $\Delta E$ is obtained by dividing the photometry data $Y_2$ by the reference value $V_{REF}$.

The correction coefficients $\Delta E$ obtained in Steps 216 and 218 are ratios between the aperture value $AV_1$ of the aperture 13 at present and the aperture value corresponding to the photometry value measured by the CCDs 22 and 23. In Step 221, the program exposure values $AV_Z$ and $T_{N1}$ are calculated based on the correction coefficient $\Delta E$ and a program diagram, which is well known. Namely, in Step 221, the aperture value $AV_2$ is corrected with respect to the aperture 13 and the corrected exposure control signal (shutter time) $T_{N1}$ is obtained.

In Step 222, the aperture 13 is set to have the aperture value $AV_2$, and in Step 223, the OFF-times of the electric charge discharge pulses $V_{OD1}$ and $V_{OD2}$ are set to "$T_{N1}$" (the corrected exposure control signal), respectively. Then, in Step 224, the electric charge discharge pulses $V_{OD1}$ and $V_{OD2}$ are controlled in accordance with the corrected exposure control signal $T_{N1}$. Namely, the electric charge discharge pulses $V_{OD1}$ and $V_{OD2}$ rise in synchronization with a fall of the vertical synchronizing signal VD and fall at a timing which is set according to the corrected exposure control signal $T_{N1}$. Then, when the OFF-time $T_{N1}$ has elapsed, the drive signals $T_{G11}$, $T_{G12}$, $T_{G21}$ and $T_{G22}$ are simultaneously outputted in synchronization with the fall of the vertical synchronizing signal VD, so that signals $X_3$ and $X_4$ corresponding to the received light amounts are outputted from the CCDs 22 and 23. These signals $X_1$ and $X_2$ correspond to the luminance signal of each pixel for one frame sensed for the electric charge accumulating time $T_{N1}$. In Step 225, it is determined whether or not the writing operations of the signals $X_3$ and $X_4$ to the image memories 41 and 43 are completed. When the operations are completed, Step 226 is executed, so that signals $X_3$ and $X_4$ are read out from the image memories 41 and 43. Then, in Step 227, the photometry data $Y_{1N}$ and $Y_{2N}$ are obtained based on signals $X_3$ and $X_4$, similar to Step 209.

In Step 228, a correction coefficient $\Delta T$ is obtained by dividing the reference value $V_{REF}$ by the arithmetic mean of the photometry data $Y_{1N}$ and $Y_{2N}$. In Step 229, the correction coefficient $\Delta T$ is multiplied by the electric charge discharge time $T_{N1}$, so that a corrected electric charge accumulating time $T_{N2}$ is obtained. The electric charge accumulating time $T_{N2}$ obtained as described above is common to the first and second CCDs 22 and 23, and if an exposure is carried out according to the electric charge accumulating time $T_{N2}$, the relationship between the photometry data $Y_1$ and $Y_2$ obtained by the first and second CCDs 22 and 23 and the exposure amount has a characteristic shown by the chained line S5 in FIG. 14.

In Step 230, the OFF-times of the electric charge discharge pulses $V_{OD1}$ and $V_{OD2}$ are set to $T_{N2}$ (a fixed exposure control signal). In Step 231, the electric charge discharge pulses $V_{OD1}$ and $V_{OD2}$ are controlled in accordance with the fixed exposure control signal $T_{N2}$, and thus, the first and second CCDs 22 and 23 are exposed for the electric charge accumulating time $T_{N1}$ so that electric charges are accumulated thereon.

In Step 232, it is determined whether the vertical synchronizing signal VD has been outputted, so that Step 233 is executed in synchronization with the vertical synchronizing signal VD. Namely, the aperture 13 is closed (reference CL in FIG. 18), and then, in Step 234, the recording gate pulse RG is outputted. At approximately the same time as the aperture 13 is closed, the drive signal $T_{G11}$ of the first CCD 22 and the drive signal $T_{G21}$ of the second CCD 23 are outputted, and as a result, image signals $P_{ODD}$ and $Q_{ODD}$ of the first field are outputted from the CCDs 22 and 23, respectively. Then, the drive signal $T_{G12}$ of the first CCD 22 and the drive signal $T_{G22}$ of the second CCD 23 are outputted, so that image signals $P_{EVEN}$ and $Q_{EVEN}$ of the second field are outputted from the CCDs 22 and 23, respectively. These image signals are stored in the image memories 41 through 44.

In Step 235, reading operations of the image signals from the image memories 41 through 44 are started. The image signals are subjected to a predetermined process in the image signal processing circuit 46 (FIG. 13), so that the image signals of the first and second fields are generated, and recorded in the recording medium (a recording disk) M. This recording operation is carried out while the recording gate pulse RG is turned ON. When it is determined in Step 236 that the recording operation of the image signals on the magnetic disk is completed, the recording gate pulse RG is turned OFF in Step 237, and thus, the image capture operation is finished.

Note, although the photometry data $Y_1$ and $Y_2$ are calculated by obtaining the center-point-weighted mean value of the luminance of one frame, similar to the second embodiment, a mean value of all the luminance signals of one frame can be used to obtain the photometry data $Y_1$ and $Y_2$. Further, the peak value among the luminances of one frame can be used, or only the luminance of the center point of one frame can be used for obtaining the photometry data.

According to the third embodiment, the same effects as the second embodiment are obtained.

Further, in the third embodiment, the photometry measurement is carried out by the CCDs 22 and 23 in accordance with the aperture value $AV_2$ and the shutter time (the corrected exposure control signal) $T_{N1}$ to sense the photometry data $Y_{1N}$ and $Y_{2N}$, and then, the photometry data $Y_{1N}$ and $Y_{2N}$ are combined to obtain the accurate shutter time (the fixed exposure control signal) $T_{N2}$. Therefore, the exposure control can be carried out with high accuracy.

Note, in the second and third embodiments, the color filter shown in FIG. 12 can be provided, instead of the color filter shown in FIG. 3.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. HEI4-262810 (filed on Sep. 4, 13, 1992), No. HEI4-272343 (filed on Sep. 16, 1992) and No. HEI4-272344 (filed on Sep. 16, 1992) which are expressly incorporated herein, by reference, in their entirety.

We claim:

1. A dual type imaging device, comprising:
a first imaging device having a spectral characteristics in which four light-sensitive elements, which are arranged in a 2×2 matrix, include at least two light-sensitive elements which are sensitive to different complementary colors from each other;
a second imaging device having a spectral characteristics in which four light-sensitive elements, which are arranged in a 2×2 matrix, include at least two light-sensitive elements which are sensitive to different complementary colors from each other;
means for sensing an R-signal, a G-signal, and a B-signal in accordance with signals obtained by superimposing signals from said four light-sensitive elements of said first imaging device on signals from said four light-sensitive elements of said second imaging device in a predetermined manner;
said first and second imaging device having complementary color-difference line-sequential type spectral characteristics;
said spectral characteristics being regularly changed in said first and second imaging devices;
said regularly changed spectral characteristics of said second imaging device being offset in a horizontal direction by a width of one light-sensitive element with respect to said regularly changed spectral characteristics of said first imaging device; and
said first imaging device outputs pixel signals (VA, i, j), (VA, i+1, j), VA, i, j+1), (VA, i+1, j+1), (VA, i, j+2), (VA, i+1, j+2), (VA, i, j+3), (VA, i+1, j+3) corresponding to said light-sensitive elements, said second imaging device outputting pixel signals (VB, i, j), (VB, i+1, j), (VB, i, j+1), (VB, i+1, j+1), (VB, i, j+2), (VB, i+1, j+2), (VB, i, j+3), (VB, i+1, j+3) corresponding to said light-sensitive elements, wherein the parameter "i" indicates a horizontal direction, the parameter "j" indicates a vertical direction, and said R-signal, said G-signal and said B-signal of said number "i" pixel are obtained as follows:

$$R_{i,k} = (VA,i,j + VA,i,j+i) - \alpha(VB,i,j + VB,i,j+1),$$

$$R_{i,k+1} = (VB,i,j+2 + VA,i,j+3) - \alpha(VA,i,j+2 + VB,i,j+3),$$

$$B_{i,k} = (VA,i,j + VB,i,j+1) - \beta(VB,i,j + VA,i,j+1),$$

$$B_{i,k+1} = (VB,i,j+2 + VB,i,j+3) - \beta(VA,i,j+2 + VA,i,j+3),$$

$$G_{i,k} = (VA,i,j + VA,i,j+1 + VB,i,j + VB,i,j+1) - pR_{i,k} - qB_{i,k},$$

$$G_{i,k+1} = (VB,i,j+2 + VA,i,j+3 + VA,i,j+2 + VB,i,j+3) - pR_{i,k+1} - qB_{i,k+1},$$

wherein $\alpha$ and $\beta$ are coefficients, and "p" and "q" are adjusted to a proper value in accordance with a luminance component.

2. A device according to claim 1, wherein said first and second imaging devices have the same constructions.

3. A device according to claim 1, wherein said first and second imaging devices have light receiving surfaces thereon, and complementary color filters are disposed on said light receiving surfaces.

4. A device according to claim 3, wherein said complementary color filters have a checkerboard arrangement in which a magenta element, a yellow element, a cyan element and a green element are arranged in a regular manner.

5. A device according to claim 4, wherein said magents element, said yellow element, said cyan element and said green element are arranged in a 2×2 matrix, the arrangement of said matrix being periodic when observing said filter in a horizontal direction, said position of said green element in said matrix being changed alternately when observing said filter in a vertical direction.

6. A device according to claim 3, wherein said complementary color filters have an arrangement in which a yellow element, a cyan element and a green element are arranged in a regular manner.

7. A device according to claim 6, wherein said yellow element, said cyan element and said green element are arranged in a 2×2 matrix, said arrangement of said matrix being periodic when observing said filter in a horizontal direction.

8. A dual imaging device according to claim 1 further comprising means for adjusting output signals from said first and second imaging device to have the same values.

9. A dual type imaging device according to claim 1 further comprising means for increasing a range of a spectrum of a color signal obtained by said first and second imaging device.

* * * * *

UNITED STATES PATENT AND TRADEMARK OFFICE
CERTIFICATE OF CORRECTION

PATENT NO. : 5,418,564
DATED : May 23, 1995
INVENTOR(S) : H. AOKI et al.

It is certified that error appears in the above-indentified patent and that said Letters Patent is hereby corrected as shown below:

At column 21, line 53 (claim 1, line 1), change "dual type" to ---dual-type---.

At column 22, line 3 (claim 1, line 18), change "device" to ---devices---.

At column 22, line 13 (claim 1, line 28), change "outputs" to ---outputting---.

At column 22, line 14 (claim 1, line 29), before "VA," (second occurrence) insert ---(---.

At column 22, line 38 (claim 1, line 53), change "Pri,k" to ---pRi,k---.

At column 22, line 50 (claim 3, line 2), change "light receiving" to ---light-receiving---.

At column 22, line 52 (claim 3, line 4), change "light receiving" to ---light-receiving---.

At column 22, lines 58 and 59 (claim 5, lines 2 and 3), change "magents" to ---magenta---.

UNITED STATES PATENT AND TRADEMARK OFFICE
CERTIFICATE OF CORRECTION

PATENT NO. : 5,418,564
DATED : May 23, 1995
INVENTOR(S) : H. AOKI et al.

It is certified that error appears in the above-indentified patent and that said Letters Patent is hereby corrected as shown below:

At column 23, line 6 (claim 8, line 1), change "dual" to ---dual-type---.

At column 24, line 3 (claim 9, line 1), change "dual type" to ---dual-type---.

At column 24, line 6 (claim 9, line 4), change "device" to ---devices---.

Signed and Sealed this

Twentieth Day of February, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,418,564
DATED : May 23, 1995
INVENTOR(S) : H. AOKI et al.

It is certified that error appears in the above-indentified patent and that said Letters Patent is hereby corrected as shown below:

On title page, in section [73], "Assignee", line 1, change "Asashi" to ---Asahi---.

Signed and Sealed this

Twenty-ninth Day of April, 1997

Attest:

BRUCE LEHMAN

Attesting Officer        Commissioner of Patents and Trademarks